US009678760B2

(12) United States Patent
Lee et al.

(10) Patent No.: US 9,678,760 B2
(45) Date of Patent: Jun. 13, 2017

(54) MEMORY CARD AND STORAGE SYSTEM HAVING AUTHENTICATION PROGRAM AND METHOD FOR OPERATING THEREOF

(71) Applicant: Samsung Electronics Co., Ltd., Suwon-si, Gyeonggi-do (KR)

(72) Inventors: Jaegyu Lee, Suwon-si (KR); Jisoo Kim, Seongnam-si (KR); Bo-Ram Shin, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 66 days.

(21) Appl. No.: 14/726,941

(22) Filed: Jun. 1, 2015

(65) Prior Publication Data

US 2016/0034683 A1 Feb. 4, 2016

Related U.S. Application Data

(60) Provisional application No. 62/032,085, filed on Aug. 1, 2014.

(30) Foreign Application Priority Data

Nov. 14, 2014 (KR) .......................... 10-2014-0158821

(51) Int. Cl.
| | |
|---|---|
| *H04L 29/06* | (2006.01) |
| *G06F 9/44* | (2006.01) |
| *G06F 21/34* | (2013.01) |
| *G06F 21/62* | (2013.01) |

(52) U.S. Cl.
CPC .......... *G06F 9/4406* (2013.01); *G06F 9/4408* (2013.01); *G06F 21/34* (2013.01); *G06F 21/6218* (2013.01)

(58) Field of Classification Search
CPC ...................................................... G06F 9/4406
See application file for complete search history.

(56) References Cited

U.S. PATENT DOCUMENTS

| | | | |
|---|---|---|---|
| 7,721,046 B2 | 5/2010 | Moro | |
| 7,861,037 B2 | 12/2010 | McAvoy et al. | |
| 7,917,697 B2 | 3/2011 | McAvoy et al. | |
| 7,934,049 B2 | 4/2011 | Holtzman et al. | |
| 7,979,658 B2 | 7/2011 | Obereiner et al. | |
| 8,285,978 B2 | 10/2012 | Kim et al. | |
| 8,549,619 B2 | 10/2013 | Bumpus et al. | |
| 8,566,574 B2 | 10/2013 | Shriver | |
| 8,589,302 B2 | 11/2013 | Prakash et al. | |
| 8,612,671 B2 | 12/2013 | Ramesh et al. | |
| 8,619,971 B2 | 12/2013 | Kurien et al. | |
| 8,627,053 B2 | 1/2014 | Mittal | |

(Continued)

FOREIGN PATENT DOCUMENTS

WO WO-2012/040588 A1 3/2012

*Primary Examiner* — Shawnchoy Rahman
(74) *Attorney, Agent, or Firm* — Harness, Dickey & Pierce, P.L.C.

(57) ABSTRACT

A memory card includes a nonvolatile memory and a device controller. The nonvolatile memory stores data. The device controller divides the nonvolatile memory into a plurality of logical units and stores an authentication program at a partial area the plurality of logical units. When connected with a host, the device controller enables the authentication program to be executable on the host.

5 Claims, 19 Drawing Sheets

(56) References Cited

U.S. PATENT DOCUMENTS

| | | | |
|---|---|---|---|
| 2004/0015709 A1* | 1/2004 | Chen | G06F 21/57 713/193 |
| 2004/0259643 A1* | 12/2004 | Gentles | G06F 21/575 463/43 |
| 2009/0089460 A1* | 4/2009 | Komoda | G06F 12/1458 710/13 |
| 2010/0174866 A1* | 7/2010 | Fujimoto | G06F 12/0246 711/115 |
| 2010/0241789 A1* | 9/2010 | Chu | G06F 12/0246 711/103 |
| 2011/0258425 A1* | 10/2011 | Galbo | G06F 9/4401 713/2 |

* cited by examiner

FIG. 5

| Offset | Size | Name | Description |
|---|---|---|---|
| | | DEVICE DESCRIPTOR | |
| 0 | 1 | bLength | Size of this descriptor inclusive=N |
| 1 | 1 | bDescriptorType | Descriptor Type Identifier |
| 2…N-1 | N-2 | DATA | Descriptor Information |

MEMORY CARD AND STORAGE SYSTEM HAVING AUTHENTICATION PROGRAM AND METHOD FOR OPERATING THEREOF

CROSS-REFERENCE TO RELATED APPLICATIONS

A claim for priority under 35 U.S.C. §119 is made to U.S. Provisional Application No. 62/032,085 filed Aug. 1, 2014, and Korean Patent Application No. 10-2014-0158821 filed Nov. 14, 2014, the entire contents of which are hereby incorporated by reference.

BACKGROUND

Embodiments of the inventive concepts described herein relate to a storage system, and more particularly, relate to a memory card having an authentication program and an operating method thereof.

A storage system includes a host and a storage device. The host and the storage device are connected through a variety of standardized interfaces, such as a serial ATA (SATA), universal flash storage (UFS), a small computer small interface (SCSI), a serial attached SCSI (SAS), and an embedded MMC (eMMC).

A host PC may use a conventional memory card by previously setting a host PC environment where the conventional memory card works normally. Preparation of the host PC environment may involve installation of an authentication program using Internet or storage media. The reason may be that user authentication on a removable memory card supporting a security function is performed to read or write a user area.

SUMMARY

Some embodiments of the inventive concepts provide a memory card, storage system, and operating method capable of certifying a removable memory card with a security function easily on a host.

In one embodiment, a memory card includes a nonvolatile memory and a device controller. The nonvolatile memory stores data. The device controller divides the nonvolatile memory into a plurality of logical units and stores an authentication program at a partial area the plurality of logical units. When connected with a host, the device controller enables the authentication program to be executable on the host.

The plurality of logical units may have one or more boot partition, the partial area may correspond to one of the one or more boot partitions, and the authentication program may be stored at the partial area.

The device controller may be used as a security manager that is configured to send the authentication program to the host using authentication information about the authentication program included in a device descriptor to manage the authentication program. The security manager may store authentication information about the authentication program at the device descriptor.

The device descriptor may include an authentication existence field for identifying whether the authentication program exists. The device descriptor may include an authentication location field for identifying a boot partition where the authentication program is stored.

In one embodiment, a storage system includes a host, a card reader, and a memory card. The card reader is connected with the host, and the memory card inserted into the card reader for a connection with the host. The memory card stores an authentication program at a partial area of a plurality of logical units. When connected with the host, the memory card enables the authentication program to be executable on the host.

The memory card may include a nonvolatile memory and a device controller. The nonvolatile memory may store data, and the device controller stores and manages the authentication program at a partial area the plurality of logical units, The device controller may store authentication information about the authentication program at a device descriptor. The device descriptor may include an authentication existence field for identifying whether the authentication program exists. The device descriptor may include an authentication location field for identifying a boot partition where the authentication program is stored.

In one embodiment, an operating method of a memory card, which has an authentication program, includes identifying whether the memory card is available; reading a device descriptor of the memory card and determining whether an authentication program exists; and determining whether or not to perform an authentication procedure for the memory card, based on whether the authentication program exists.

The operating method may further include determining a location where the authentication program exists, when the authentication program exists. The memory card may include a plurality of logical units, the plurality of logical units has one or more boot partition, the partial area may correspond to one of the one or more boot partitions, and the authentication program may be stored at the partial area.

The device descriptor may include an authentication existence field for identifying whether the authentication program exists. The device descriptor may include an authentication location field for identifying a boot partition where the authentication program is stored.

The operating method may further include mounting the identified boot partition on a host. The operating method may further include executing an authentication program stored at the identified boot partition. The operating method may further include executing an authentication operation about a user partition after the authentication program is executed. The operating method may further include mounting the user partition on the host when the authentication operation about the user partition is passed.

In another embodiment, a storage device, includes a first non-transitory computer readable medium divided into a plurality of logical units. At least one of the logical units is configured to store an authentication program. The storage device also includes a second non-transitory computer readable medium configured to store a device descriptor. The device descriptor includes an indicator, and the indicator indicates whether the storage device supports a security function. The device descriptor includes location data indicating a location of the authentication program in the first computer readable medium if the indicator indicates the storage device supports the security function.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 5 is a table showing a format of a device descriptor described with reference to FIG. 4;

DETAILED DESCRIPTION

Figure 1:
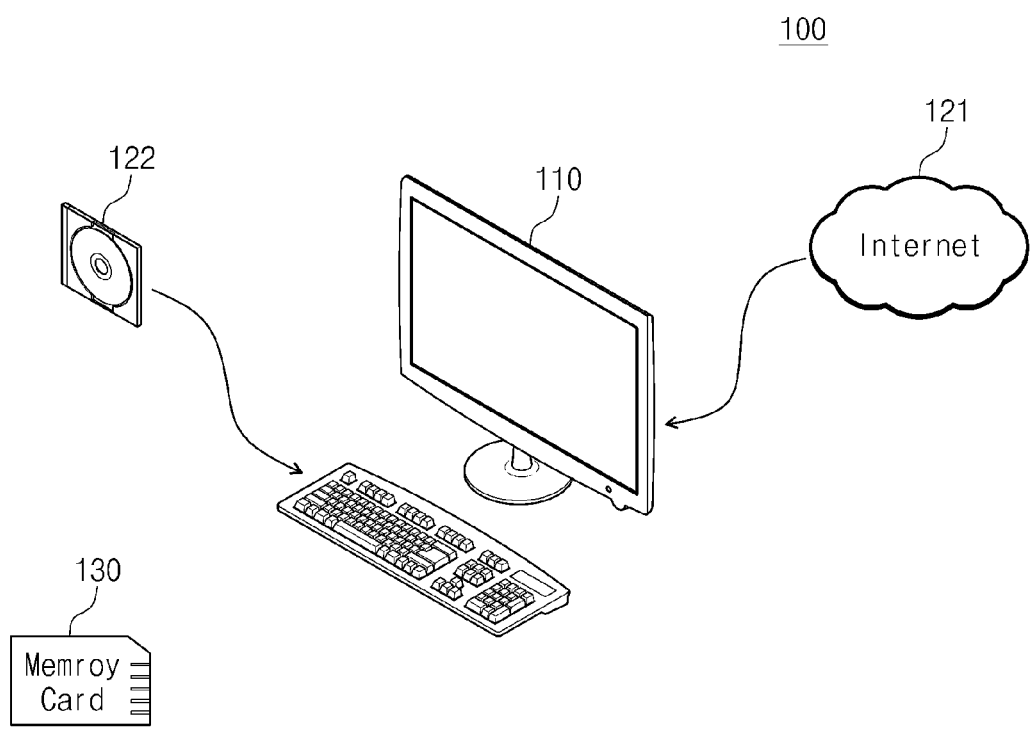
FIG. 1 is a conceptual diagram of a computer system showing a method where a host PC authenticates a memory card.

Some embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the concepts of the inventive concepts to those skilled in the art. Accordingly, known processes, elements, and techniques are not described with respect to some of the embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a conceptual diagram of a computer system showing a method where a host PC authenticates a memory card. Referring to FIG. 1, a computer system 100 may include a host PC 110, an internet 121, a compact disc (CD) or digital video disc (DVD) 122, and interface to a memory card 130. The memory card 130 may be a removable memory card that supports a security function. The removable memory card may include the following: SD (Secure Digital) card, micro SD card, MMC (Multi-Media Card), UFS (Universal Flash Storage) card, and etc.

To use the removable memory card 130 supporting a security function, a user may previously download an authentication program through the internet 121 to install it on the host PC 100. Alternatively, the user may install an authentication program using the CD or DVD 112 to use the removable memory card 130. The reason may be that user authentication is first performed to read or write a user area of the removable memory card 130 to which the security function is applied.

The removable memory card 130 may be used with various types of host PCs and may have a security function for protecting data stored therein stably. For this, the removable memory card 130 may perform authentication in various host PC environments. Thus, there is required a host PC environment that enables authentication on the removable memory card 130.

However, operating systems may use different authentication programs due to various host PC environments. This inconvenience may be intensified in consideration of environments where the removable memory card 130 is used. As illustrated in FIG. 1, to use the removable memory card 130, a user may previously install an authentication program, which a maker provides, on the host PC 110.

A removable memory card according to an embodiment of the inventive concepts may include an authentication program that is executable on a host and is stored at a specific area of the removable memory card. When inserted into a host, the removable memory card may enable the internally stored authentication program to be executed on the host. A storage system according to an embodiment of the inventive concepts may make it possible to authenticate a removable memory card having a security function easily on a host.

Figure 2:
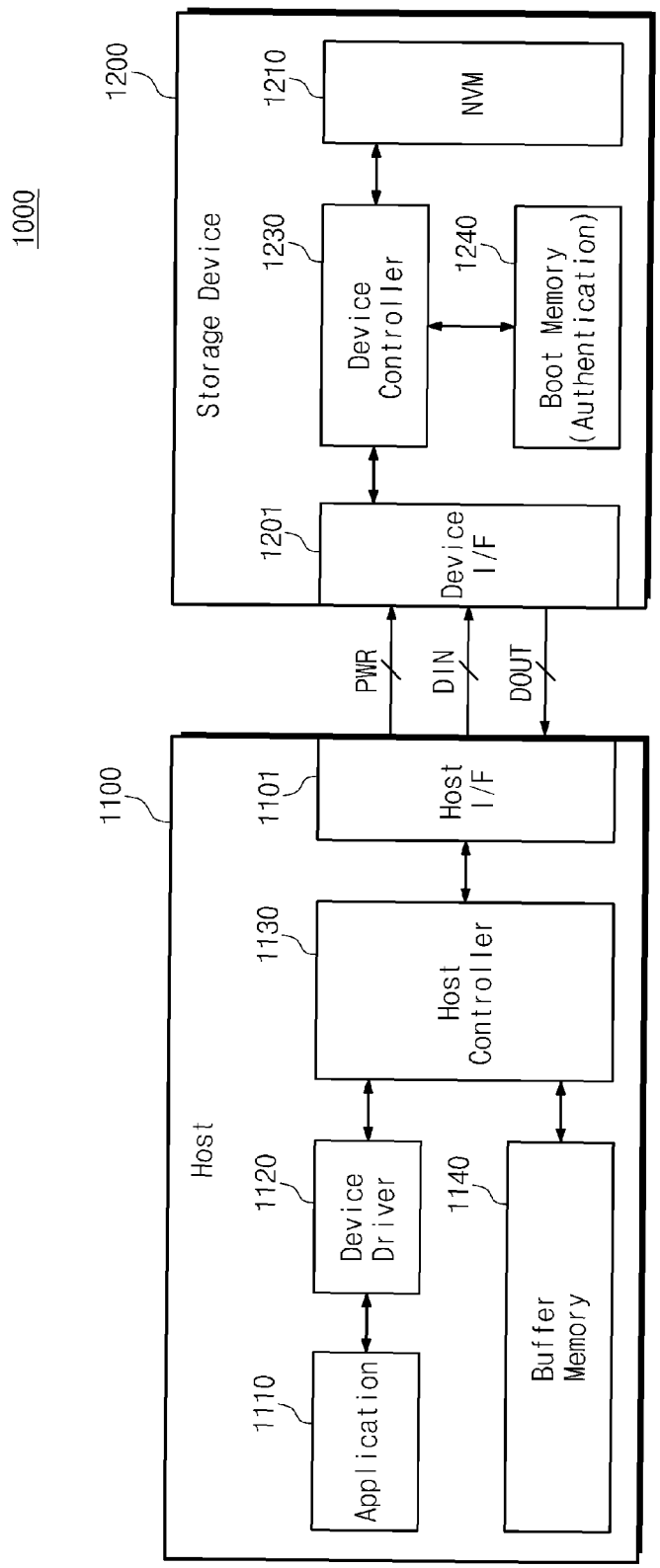
FIG. 2 is a block diagram schematically illustrating a storage system.

FIG. 2 is a block diagram schematically illustrating a storage system. Referring to FIG. 2, a storage system 1000 may include a host 1100 and a storage device 1200.

The host 1100 and the storage device 1200 may be connected through a variety of standardized interfaces, such as a serial ATA (SATA), universal flash storage (UFS), a small computer small interface (SCSI), a serial attached SCSI (SAS), an embedded MMC (eMMC), and etc. The host 1100 and the storage device 1200 may be a host PC 110 and a removable memory card 130 described with reference to FIG. 1.

As illustrated in FIG. 2, a host interface 1101 and a device interface 1201 may be connected through data lines DIN and DOUT for exchanging data or signals and a power line PWR for providing a power. The host 1100 may include an application 1110, a device driver 1120, a host controller 1130, and a buffer memory 1140.

The application 1110 may be of various application programs to be executed by the host 1100. The device driver 1120 may drive peripheral devices that are used through connection with the host 1100, and it may drive the storage device 1200, for example. The application 1110 and the device driver 1120 may be separate modules that operate on the host 1100 or may be implemented by software or firmware.

Also, the application 1110 or the device driver 1120 may be driven on an internal memory (not shown) according to a control of a central processing unit (not shown). The central processing unit that controls the application 1110 or the device driver 1120 may be placed inside or outside the host controller 1130.

The host controller 1130 may exchange data with the storage device 1200 through the host interface 1101. Not only is the buffer memory 1140 used as a main memory or a cache memory of the host 1100, but it is also used as a driving memory for driving software, such as the application 1110 or the device driver 1120.

The storage device 1200 may be connected to the host 1100 through the device interface 1201. The storage device 1200 may include a nonvolatile memory 1210, a device controller 1230, and a boot memory 1240. The nonvolatile memory 1210 may include the following: flash memory, MRAM, PRAM, FeRAM, and etc. The device controller 1230 may exchange data with the nonvolatile memory 1230 through an address or data bus.

The boot memory 1240 may be an area for storing a boot code. The boot memory 1240 may be implemented with a nonvolatile memory. The boot memory 1240 may be implemented in the device controller 1230 or may be implemented in one chip together with the device controller 1230. The boot memory 1240 may store an authentication program.

In the storage device 1240 shown in FIG. 2, the authentication program that is executable on the host 1100 may be stored in the boot memory 1240. Also, the storage device 1200 may store authentication information associated with a location where the authentication program is stored. When connected with the host 1100, the storage device 1200 may enable the stored/embedded authentication program to be executed on the host 1100, depending on authentication information of the device controller 1230. With the inventive concepts, it is possible to authenticate the removable storage device 1200, which supports a security function, on the host 1100 easily.

The storage system 1000 shown in FIG. 2 is applicable to a mobile device or any other electronic device that is based on a flash memory. Below, universal flash storage (UFS) may be exemplified to describe a configuration and an operating method of the storage system 1000 shown in FIG. 2.

Figure 3:
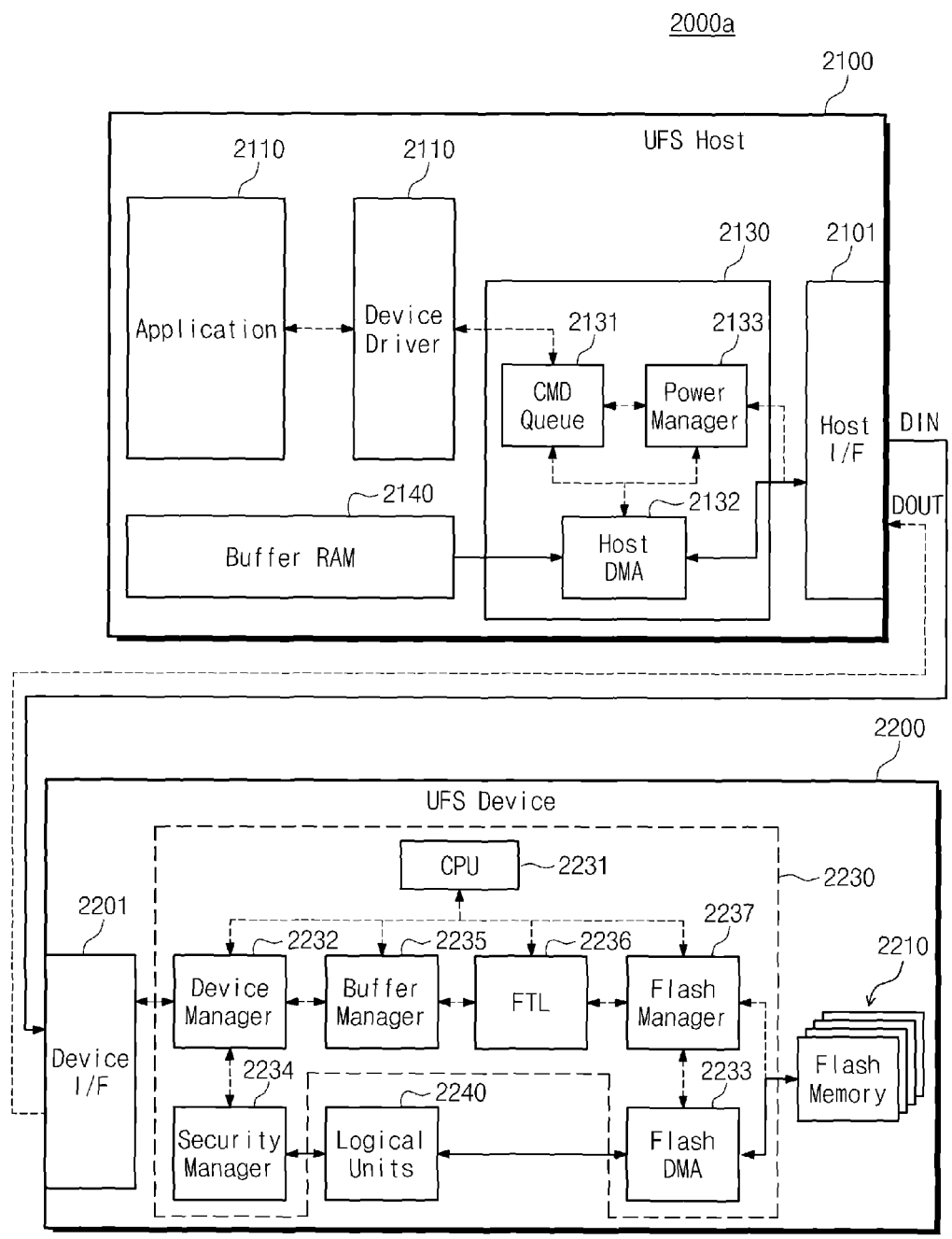
FIG. 3 is a block diagram schematically illustrating a flash memory-based UFS system.

FIG. 3 is a block diagram schematically illustrating a flash memory-based UFS system. Referring to FIG. 3, an UFS system 2000a may include an UFS host 2100 and an UFS device 2200.

The UFS host 2100 may include an application 2110, a device driver 2120, a host controller 2130, and a buffer RAM 2140. The host controller 2130 may include a command queue 2131, a host DMA 2132, and a power manager 2133. The command queue 2131, host DMA 2132, and power manager 2133 may be algorithm, software, or firmware that is executed on the host controller 2130.

Commands (e.g., a write command) generated by the application 2110 and the device driver 2120 in the UFS host 2100 may be managed by the command queue 2131 of the host controller 2130. The command queue 2131 may sequentially store commands to be provided to the UFS device 2200. Provided to the host DMA 2132 are the commands that are stored in the command queue 2131. The host DMA 2132 sends the commands to the UFS device 2200 through a host interface 2101.

As shown in FIG. 3, the UFS device 2200 may contain a flash memory 2210, a device controller 2230, and logical units 2240. The UFS device 2200 may be used in the form of memory card (full size or micro size). The UFS device 2200 may be used as a removable memory card that supports a security function as described above. Authentication may be required to use the UFS device 2200 at the UFS host 2100.

The device controller 2230 may include a Central Processing Unit (CPU) 2231, a device manger 2232, a flash DMA 2233, a security manager 2234, a buffer manager 2235, a flash translation layer (FTL) 2236, and a flash manager 2237. Herein, the device manager 2232, flash DMA 2233, security manager 2234, buffer manager 2235, FTL 2236, and flash manager 2237 may be algorithm, software, or firmware that operates in the device controller 2230.

A command transferred from the UFS host 2100 to the UFS device 2200 may be provided to the device manager 2232 through the device interface 2201. The device manager 2232 may analyze a command provided from the UFS host 2100, and it may authenticate the command by means of the security manager 2234. The device manager 2232 may allocate the buffer RAM 2240 so as to receive data through the buffer manager 2235. Being ready to transfer data, the device manager 2232 may send RTT (READY_TO_TRANSFER) UFS protocol information unit (UPIU) to the UFS host 2100.

The UFS host 2100 may send data to the UFS device 2200 in response to the RTT UPIU. The data may be sent to the UFS device 2200 through the host DMA 2132 and the host interface 2101. The UFS device 2200 may store the received data in a buffer RAM (not shown) through the buffer manager 2235. The data stored in the buffer RAM may be provided to the flash manger 2237 through the flash DMA 2233. The flash manager 2237 may store data at a selected address of the flash memory 2210, based on address mapping information of the FTL 2236.

If a data transfer operation and a program operation for a command are completed, then the UFS device 2200 may send a response signal to the UFS host 2100 through an interface and may inform the UFS host 2100 of command completion. The UFS host 2100 may inform the device driver 2120 and the application 2110 of whether a command corresponding to the response signal is processed and then may terminate an operation on the command.

An environment where the UFS host 2100 uses the UFS device 2200 may have to be set to perform the above-described operation, with the UFS device 2200 connected to the UFS host 2100. An authentication program may be previously stored such that the UFS host 2100 authenticates the UFS device 2200. However, the UFS host 2100 has to use the UFS device 2200 even though the authentication program is not stored at the UFS host 2100.

For this purpose, the UFS device 2200 according to an embodiment of the inventive concepts may store an authentication program, which is executable on the UFS device 2100, at a portion of the logical units 2240. The UFS device 2200 may store authentication information associated with whether an authentication program exists at the security manager 2234 or with a location where the authentication program is stored. When connected with the UFS host 2100, the UFS device 2200 may enable the stored authentication program to be executed on the UFS host 2100, depending on the authentication information of the security manager 2234.

With the inventive concepts, even though an authentication program is not previously stored at the UFS host 2100, it is possible to easily authenticate the UFS device 2200 that supports a security function.

Figure 4:
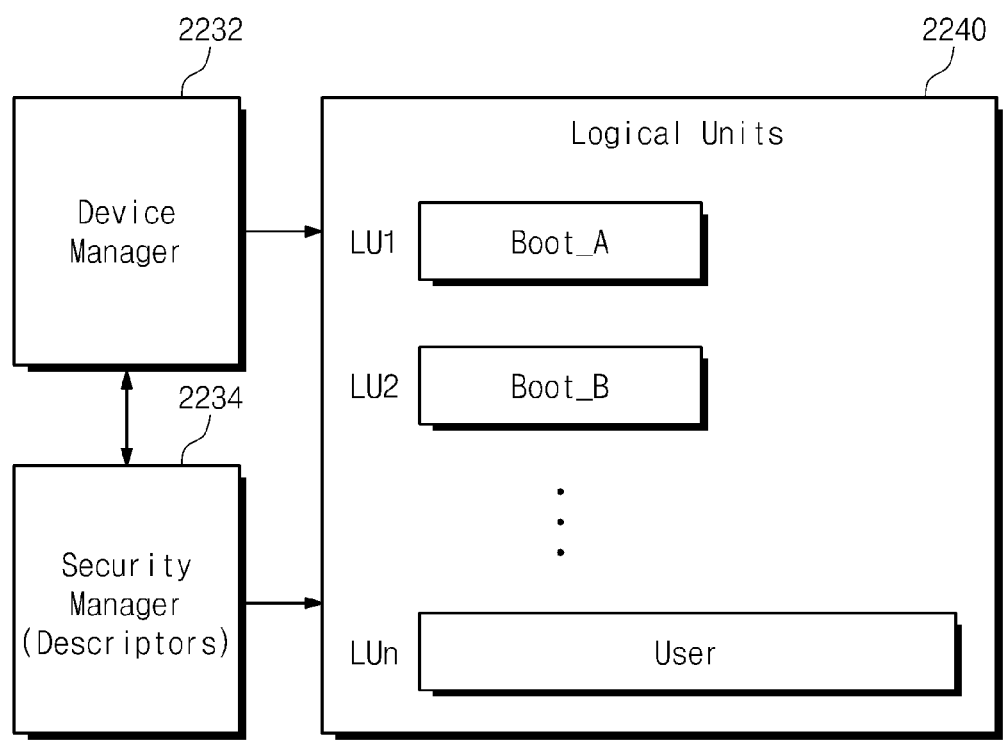
FIG. 4 is a block diagram schematically illustrating logical units of a UFS device shown in FIG. 3.

FIG. 4 is a block diagram schematically illustrating logical units of a UFS device shown in FIG. 3. Referring to FIG. 4, a UFS device 2200 may include one or more logical units LU1 through LUn (n being a natural number). Each logical unit may be an independent processing entity that processes a command. The UFS device 2240 may be formed of a plurality of logical units (e.g., eight logical units) to store a boot code, an application code, and user data.

A first logical unit LU1 may be a boot partition for storing an A boot code Boot_A, a second logical unit LU2 may be a boot partition for storing a B boot code Boot_B, and an n-th logical unit LUn may be a user partition for storing user data. As illustrated in FIG. 4, the UFS device 2200 may include two separate boot partitions besides the user partition.

A security manager 2234 may manage various sorts of descriptors. The descriptors may include the following: device descriptor, configuration descriptor, geometry descriptor, unit descriptor, replay protected memory block (RPMB) unit descriptor, power parameters descriptor, and interconnect descriptor.

The security manager 2234 may store authentication information at the device descriptor. That is, the device descriptor of the security manager 2234 may have an authentication existence field indicating whether an authentication program exists and an authentication location field indicating a boot partition where the authentication program is stored.

FIG. 5 is a table showing a format of a device descriptor described with reference to FIG. 4. Referring to FIG. 5, a header of a device descriptor may include a field bLength indicating a length and a field bDescriptorType for identifying a type. Here, a length value may include a total length of the header and additional data.

Authentication information may be stored at a data field indicating descriptor information. For example, when a specific area of a user partition needs to be authenticated, an authentication existence field may be set to "TRUE". Based on this information, a UFS host 2100 may determine whether a removable UFS device 2200 supporting a security function is connected. Also, the UFS host 2100 may check the authentication location field to determine whether to mount any one of a boot partition Boot_A and a boot partition Boot_B.

The UFS device 2200 according to an embodiment of the inventive concepts may internally store an authentication program executable on the UFS host 2100 at a boot partition. When the UFS device 2200 is connected with the UFS host 2100, the UFS host 2100 may automatically recognize a boot partition to perform an authentication operation. After connection to the UFS host 2100, the UFS device 2200 may be used through authentication.

Figure 6:
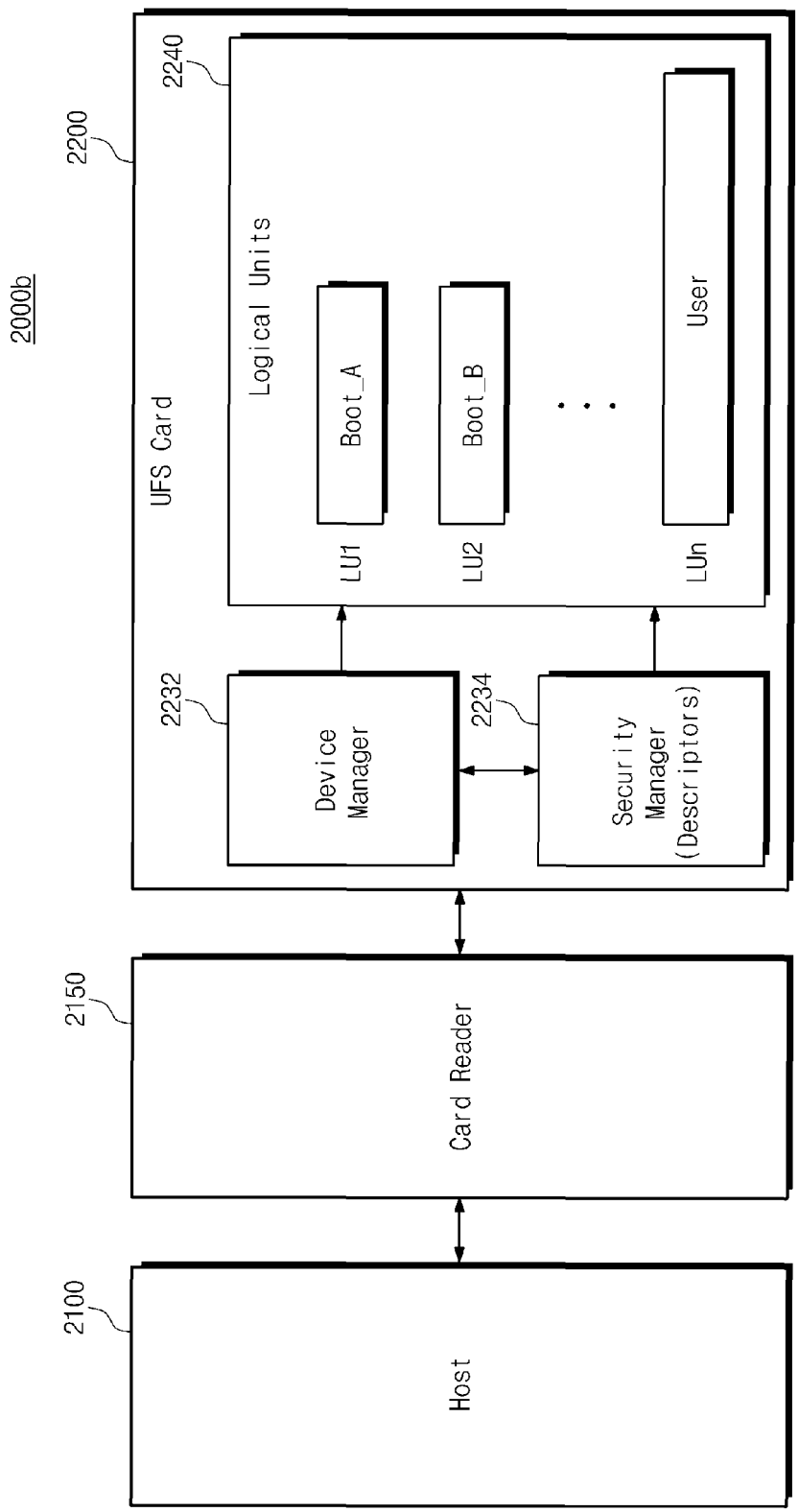
FIG. 6 is a block diagram schematically illustrating a UFS system according to another embodiment of the inventive concepts.

FIG. 6 is a block diagram schematically illustrating a UFS system according to another embodiment of the inventive concepts. Referring to FIG. 6, a storage system 2000b may contain a host 2100, a card reader 2150, and a UFS card 2200. The UFS card 2200 may support a security function, and user authentication may be required to use the UFS card 2200.

The host 2100 may be a computer or a mobile electronic device that is driven using Windows, Linux, MAC, Android, and iOS. The card reader 2150 may be a device that enables the host 2100 and the UFS card 2200 to communicate with each other. The card reader 2150 may be connected with the host 2100 through a USB interface and with the UFS card 2200 through a UFS interface.

The UFS card 2200 may include a device manager 2232, a security manager 2234, and logical units 2240. The security manager 2234 may include device descriptors. First and second logical units LU1 and LU2 may be boot partitions for storing boot codes Boot_A and Boot_B, respectively. A remaining logical unit LUn may be a user partition for storing user data. The security manager 2234 may store an authentication existence field bDeviceLocked indicating whether or not of authentication and an authentication location field bAuthPartition indicating a boot partition where an authentication program is stored, at the device descriptor.

For example, based on the authentication existence field bDeviceLocked, a host 2100 may determine whether there is connected a removable UFS card 2200 supporting a security function. Also, the host 2100 may check the authentication location field bAuthPartition to determine whether to mount any one of the boot partition Boot_A and the boot partition Boot_B.

Figure 7:
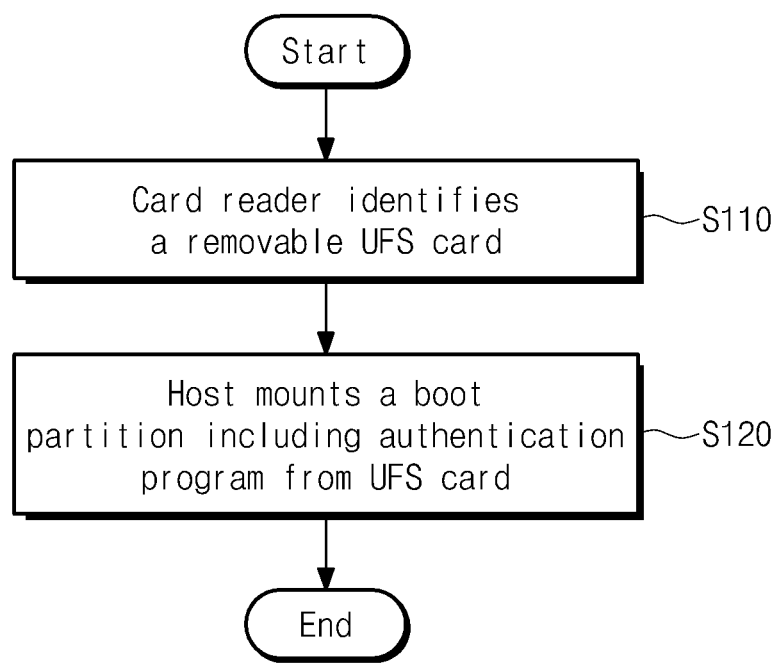
FIG. 7 is a flow chart showing an operating method of a UFS system shown in FIG. 6.

FIG. 7 is a flow chart showing an operating method of a UFS system shown in FIG. 6. Referring to FIGS. 6 and 7, when a removable UFS card 2200 inserted into a card reader 2150 is connected with a host 2100, in step S110, the card reader 2150 may identify the removable UFS card 2200. At this time, the card reader 2150 may determine whether the removable UFS card 2200 inserted supports an authentication function.

The removable UFS card 2200 that supports the authentication function may have an authentication existence field bDeviceLocked indicating whether or not to perform authentication and an authentication location field bAuthPartition indicating a boot partition where an authentication program is stored.

For example, when a specific area of a user partition needs to be authenticated, the authentication existence field bDeviceLocked may be set to "TRUE". Based on this information, the card reader 2150 may identify that authentication of the removable UFS card 2200 should be performed The host 2100 may check the authentication location field bAuthPartition to determine whether to mount any one of a boot partition Boot_A and a boot partition Boot_B. In step S120, the host 2100 may mount a boot partition, which includes an authentication program, from the UFS card 2200.

Figure 8:
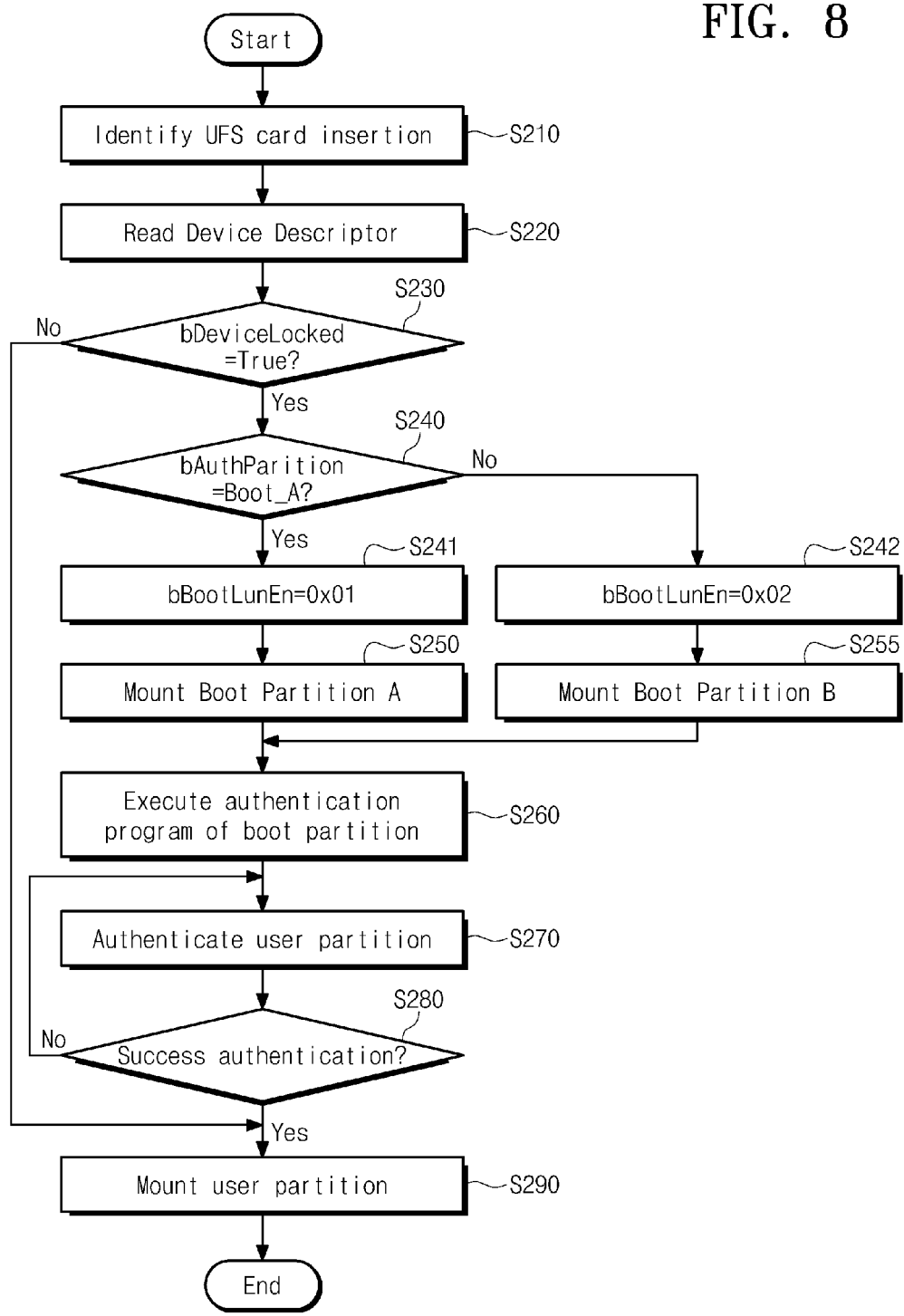
FIG. 8 is a flow chart showing a method in which a host mounts a boot partition of a removable UFS card supporting a security function.

FIG. 8 is a flow chart showing a method in which a host mounts a boot partition of a removable UFS card supporting a security function. A removable UFS card 2200 supporting a security function is inserted into a card reader 2150. When an authentication existence field bDeviceLocked has a value of "TRUE", the card reader 2150 may check an authentication location field bAuthPartition to determine whether to recognize any one of boot partitions Boot_A and Boot_B as USB mass storage.

In step S210, the card reader 2150 may determine whether the UFS card 2200 is inserted. When connected with a host 2100, the card reader 2150 may automatically identify whether a removable UFS card 2200 is inserted into the card reader 2150.

In step S220, the card reader 2150 may read a device descriptor of the UFS card 2200. The device descriptor may managed by a security manager 2234 of the UFS card 2200. The device descriptor may have an authentication existence field bDeviceLocked indicating whether or not to perform authentication and an authentication location field bAuthPartition indicating a boot partition where an authentication program is stored In step S230, the card reader 2150 may determine whether the authentication existence field bDeviceLocked of the device descriptor is set to "TRUE". The card reader 2150 may determine whether the removable UFS card 2200 supports an authentication function, based on authentication information. When the removable UFS card 2200 supports an authentication function, the authentication existence field bDeviceLocked of the device descriptor may be set to "TRUE". When the removable UFS card 2200 does not support an authentication function, the authentication existence field bDeviceLocked of the device descriptor may be set to "FALSE". In the event that the authentication function is not applied, the method proceeds to step S290. In the event that the authentication function is applied, the method proceeds to step S240.

In step S240, the card reader 2150 may check the authentication location field bAuthPartition of the device descriptor to determine whether or not the boot partition Boot_A has been set. If set to the boot partition Boot_A is detected, in step S241, a boot enable field bBootLunEn of the device descriptor may be set to "0x01". If setting to the boot partition Boot_B is determined, in step S242, a boot enable field bBootLunEn of the device descriptor may be set to "0x02".

In step S250, the host 2100 may mount the boot partition Boot_A when setting to the boot partition Boot_A is detected. In step S255, the host 2100 may mount the boot partition Boot_B when setting to the boot partition Boot_B is detected.

In step S260, the host 2200 may execute an authentication program of the mounted boot partition. In step S270, the host 2200 may authenticate a user partition. In step S280, whether the authentication has passed may be determined. When the authentication does not pass, the method proceeds to step S270. When the authentication does pass, in step S290, the host 2100 may mount the user partition.

Returning to FIG. 6, the UFS card 2200 according to an embodiment of the inventive concepts may store an authentication program, which is executable on the host, 2100 at a boot partition. When the UFS card 2200 is connected with the host 2100 through the card reader 2150, the host 2100 may automatically recognize a boot partition to perform an authentication operation. After connection with the host 2100, the UFS card 2200 may be used through authentication.

Meanwhile, when a UFS system 2000*a* or 2000*b* shown in FIG. 3 or 6 is applied to a mobile device, write protection is set or released for reliability of data and security. The UFS system 2000*a* or 2000*b* according to an embodiment of the inventive concepts may perform a command authentication procedure using Key-ed Crypto Hash, private key, and request count.

The inventive concepts may release or set write protection through the authentication procedure or may change an attribute of the write protection. Also, the inventive concepts may set a write protection area by the logical block address (LBA) of the host 2100, not by the whole partition or by the group. Here, the group may be formed by dividing the partition by a desired (or, alternatively a predetermined) size.

Below, the setting and releasing of write protection and a change in attribute in a storage system according to an embodiment of the inventive concepts will be more fully described using a UFS system 2000 shown in FIG. 3 or 6.

Figure 9:
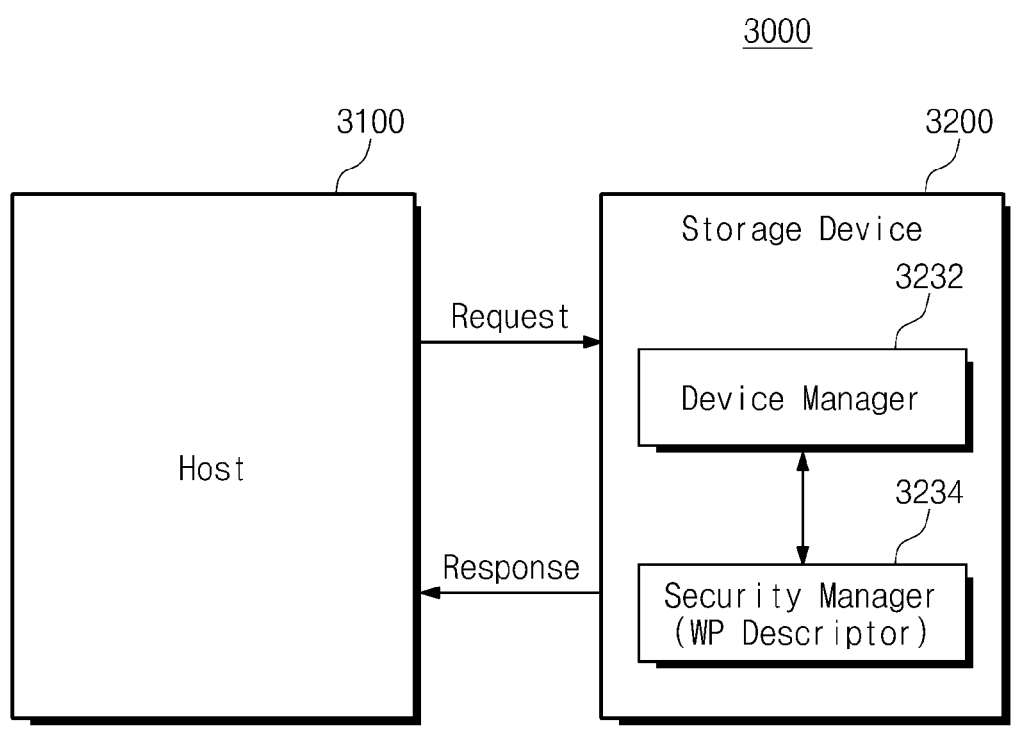
FIG. 9 is a block diagram schematically illustrating a UFS system according to still another embodiment of the inventive concepts.

FIG. 9 is a block diagram schematically illustrating a UFS system according to still another embodiment of the inventive concepts. Referring to FIG. 9, a UFS system 3000 may contain a host 3100 and a storage device 3200. The storage device 3200 may include a device manager 3232 and a security manager 3234. The security manager 3234 may manage a "WP Descriptor".

The WP Descriptor may be stored at a nonvolatile memory such as a flash memory 2210 (refer to FIG. 3) or a ROM and may be loaded onto a volatile memory, such as DRAM or SRAM, at power-on. The WP Descriptor may be used to set or release write protection or to change an attribute of write protection.

The following table 1 exemplarily shows a configuration and a description of the WP Descriptor.

TABLE 1

| Name | Description | |
|---|---|---|
| PID (Partition ID) | Partition ID to be write protected | |
| Start LBA | Start address to be write protected | |
| Length | Size to be write protected<br>When Length = 0, write protection being the entire or overall applied to partition | |
| Writable | Whether write protection is applied, based on True/False | |
| Type | P | Maintaining write protection before power-off or hardware (HW) reset<br>Writable being set to True after power-on and being not changed before power-off or HW reset if Writable is set to False |
| | NV-P | Writable being changed and applied by Request but being always set to False after power-off or HW reset |
| | VN | Writable being changed only by Request |

Referring to the table 1, the WP Descriptor may include partition ID (PID), start LBA, length, writable, and type. The partition ID (PID) may be used to identify a partition of the flash memory to which write protection will be applied. The start LBA may indicate a start address of a logical block to which the write protection will be applied. The length may mean the size to be write-protected.

Figure 10:
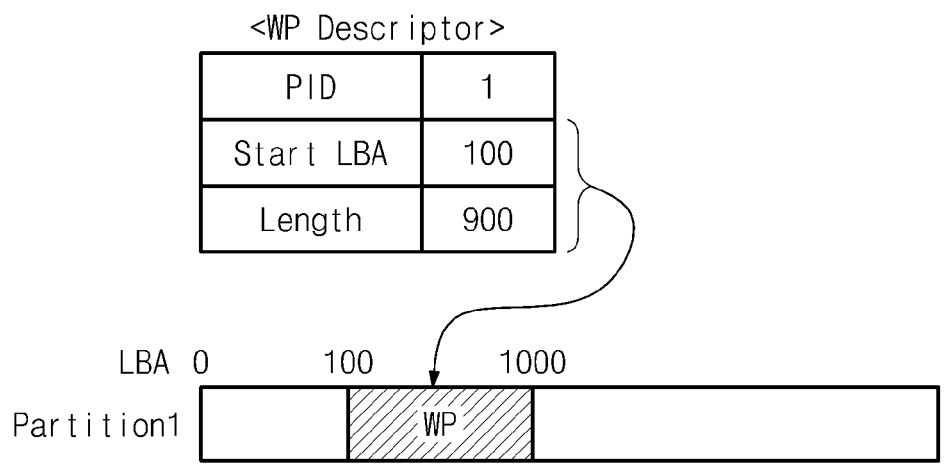
FIG. 10 is a conceptual diagram showing an embodiment where a write protection area is set by the logical block address of a host.

FIG. 10 is a conceptual diagram showing an embodiment where a write protection area is defined in part by the logical block address LBA of a host. Referring to FIG. 10, a partition ID may be "1". That is, write protection may be applied to a first partition. A start address of a WP Descriptor may be "100", and a length may be "900". Thus, the write protection area may start from LBA 100 and may end at LBA 1000. Namely, the start LBA and length define the memory area of the partition, which may be write protected. In FIG. 10, the first partition may be a boot partition where an authentication program is stored, and the write protection area may be an area of the boot partition where the authentication program is stored.

Figure 11:
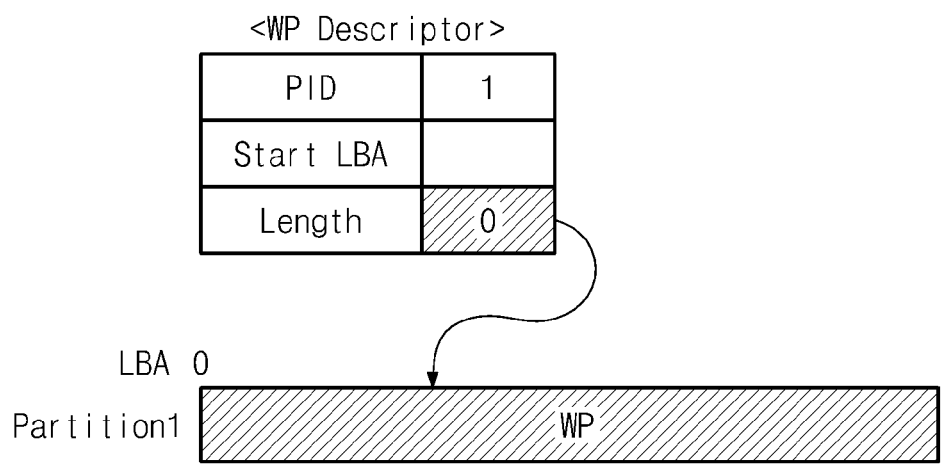
FIG. 11 is a conceptual diagram showing an embodiment where write protection is applied to the whole partition.

FIG. 11 is a conceptual diagram showing an embodiment where write protection is applied to the whole partition. Referring to table 1, when a length of LBA of a WP Descriptor may be set to "0", write protection may be applied to the whole partition. In FIG. 11, an embodiment of the inventive concepts is exemplified as a partition ID of the WP Descriptor is "1" and a length thereof is "0". Thus, the write protection may be overall applied to a first partition. That is, in the inventive concepts, the whole boot partition where an authentication program is stored may be write-protected.

Referring to table 1, "writable" may indicate whether the write protection is applied. "Writable" may be set to "True" or "False". When "writable" is set to "True", a corresponding area may be writable, and, the write protection may not be applied. When "writable" is set to "False", a corresponding area may not be writable. That is, the write protection may be applied.

Continuing to refer to table 1, the write protection may be divided into three types: P, NV, and VN-P. In case of the P type, the write protection may be maintained before power-off or hardware (HW) reset, and "writable" may be always set to "True" after power-on. When "writable" is set to "False", it may not be changed before power-off or HW reset. In case of the NV type, "writable" may be changed only by a request of a host 2100 or 3100. In case of the NV-P type, "writable" may be changed by a request of the host 2100 or 3100. However, in the event that the WP Descriptor is set to the NV-P type, "writable" may be always set to "False" after power-off or HW reset.

Figure 12:
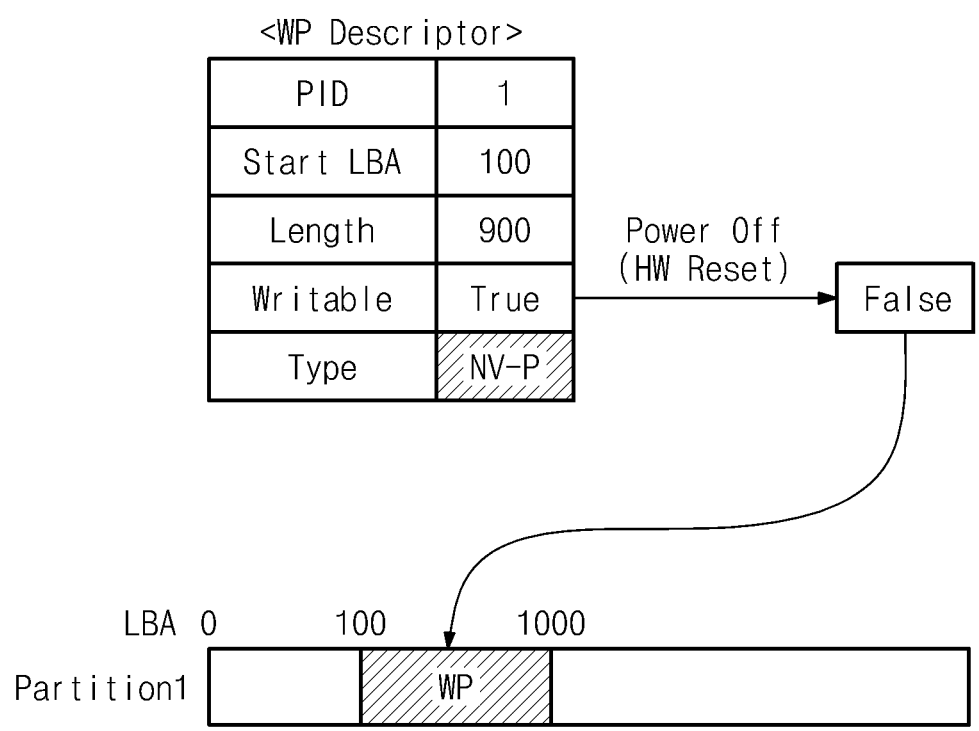
FIG. 12 is a conceptual diagram showing an embodiment where a WP Descriptor is set to an NV-P type.

FIG. 12 is a conceptual diagram showing an embodiment where a WP Descriptor is set to an NV-P type.

In FIG. 11, an embodiment of the inventive concepts is exemplified as in the WP Descriptor, a partition ID is "1", a start LBA is "100", a length is "900", "writable" is set to "True", and a type is set to NV-P. When a UFS system 2000 or 3000 is powered off or hardware reset, "writable" may be changed into "False" because the WP Descriptor is set to the NV-P type. That is, since write protection is applied, it is impossible to perform a write operation about a corresponding area from LBA 100 to LBA 1000.

The following table 2 exemplarily shows initial values of a WP Descriptor shown in FIG. 9 for discussion purposes. Values of the WP Descriptor shown in the table 2 may be default values.

TABLE 2

| PID (Partition ID) | Start LBA | Length | Writable | Type |
|---|---|---|---|---|
| 1 | 0 | 0 | True | P |
| 2 | 0 | 0 | True | P |
| 3 | 0 | 0 | True | P |
| ... | ... | ... | ... | ... |
| n | 0 | 0 | True | P |

Referring to table 2, a storage area of a storage device 2200 or 3200 may be divided into n partitions. A start LBA and a length of each of the partitions PID1 through PIDn may be set to "0". Since a length for write protection is set to "0", the whole partition may be write-protected. "Writable" of each of the partitions PID1 through PIDn may be set to "True", and a type of each of the partitions PID1 through PIDn may be set to "P".

The following table 3 shows an example, for discussion purposes, of a configuration of a WP Descriptor at any point in time when a storage system 2000 or 3000 operates.

TABLE 3

| PID (Partition ID) | Start LBA | Length | Writable | Type |
|---|---|---|---|---|
| 1 | 0 | 5000 | False | P |
| 2 | 0 | 4000 | True | NV-P |
| 3 | 9000 | 10000 | True | P |
| ... | ... | ... | ... | ... |
| n | 0 | 2000 | False | NV |

Referring to table 3, a start LBA of a first partition PID1 may be "0", and a length thereof may be "5000". "Writable" may be set to "False", and a write protection type may be set to "P". A start LBA of a second partition PID2 may be "0", and a length thereof may be "4000". "Writable" may be set to "True", and a write protection type may be set to "NV-P". That is, "writable" about a write protection area (LBA0~LBA4000) of the second partition PID2 may be changed by a request of a host 3100, and "writable" may be set to "False" after power-off or HW reset.

A start LBA of a third partition PID3 may be "9000", and a length thereof may be "10000". "Writable" may be set to "True", and a write protection type may be set to "P". A start LBA of an n-th partition PIDn may be "0", and a length thereof may be "2000". "Writable" may be set to "False", and a write protection type may be set to "NV". "Writable" about the n-th partition PIDn may be changed only by a request of the host 3100.

The following table 4 shows an example in which a WP Descriptor has been changed after power-off or HW reset.

TABLE 4

| PID (Partition ID) | Start LBA | Length | Writable | Type |
|---|---|---|---|---|
| 1 | 0 | 5000 | True | P |
| 2 | 0 | 4000 | False | NV-P |
| 3 | 9000 | 10000 | True | P |
| ... | ... | ... | ... | ... |
| n | 0 | 2000 | False | NV |

Referring to table 4, "writable" of a first partition PID1 may be changed from "False" to "True" as compared to table 3. In table 3, "writable" of a second partition PID2 may be set to "True". Since a write protection type is set to "NV-P", "writable" of the WP Descriptor is changed from "True" to "False" at power-off or HW reset. "Writable" of a third partition PID3 may maintain "True". Since a write protection type of an n-th partition PIDn is "NV", "writable" may be changed by a request of the host 3100.

In the inventive concepts, it is assumed that the host 3100 and the storage device 3200 share a private key in a secure manner.

Figure 13:
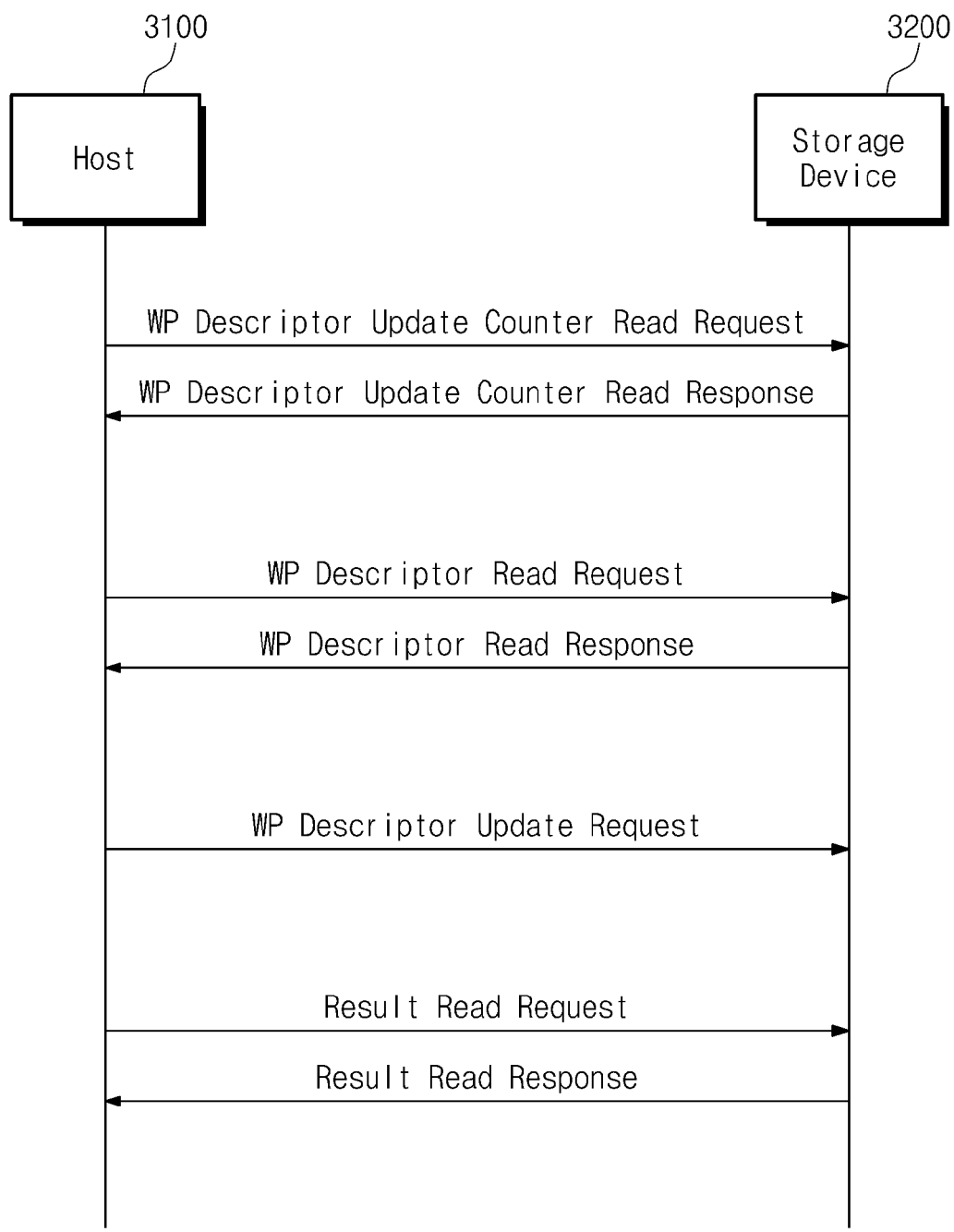
FIG. 13 is a timing diagram showing requests and responses for setting or releasing write protection of a storage system according to an embodiment of the inventive concepts.

FIG. 13 is a timing diagram showing requests and responses for setting or releasing write protection of a storage system according to an embodiment of the inventive concepts. Referring to FIG. 13, the host 3100 may issue a request for the setting and releasing of write protection to a storage device 3200. The storage device 3200 may respond to the request of the host 3100.

Referring to FIG. 13, the host 3100 may provide the storage device 3200 with four types of requests for the setting and releasing of write protection. That is, the host 3100 may provide the storage device 3200 with the following requests: WP Descriptor Update Counter Read Request, WP Descriptor Read Request, WP Descriptor Update Request, and Result Read Request.

The storage device 3200 may provide the host 3100 with three types of responses in response to a request of the host 3100. That is, the storage device 3200 may provide the host 3100 with the following responses: WP Descriptor Update Counter Read Response, WP Descriptor Read Response, and Result Read Response. The host 3100 may receive a response from the storage device 3200 with respect to remaining requests other than the WP Descriptor Update Request.

The following table 5 shows a configuration of a data frame for processing requests and responses.

TABLE 5

| Name | Description |
|---|---|
| Request/Response Type | Four request types for WP setting and releasing and configuration change<br>(0x1) WP Descriptor Update Counter Read Request<br>(0x2) WP Descriptor Read Request<br>(0x3) WP Descriptor Update Request<br>(0x4) Result Read Request<br>Three response types for WP setting and releasing and configuration change<br>(0x5) WP Descriptor Update Counter Read Response<br>(0x6) WP Descriptor Read Response<br>(0x7) Result Read Response |
| WP Descriptor Update Counter | WP Descriptor Update Counter requested up to now |
| Nonce | Random number for preventing replay attack |
| WP Descriptor | WP Descriptor (Request Type = 0x3) to be applied<br>WP Descriptor (Response Type = 0x6) applied |
| Result | Result on request<br>Causes at success or fail |
| HMAC | HMAC for checking authenticated request |

The host 3100 may provide the storage device 320 with the data frame shown in table 5 to perform an operation corresponding to each request. Here, results of the WP Descriptor Update Counter Read Request and the WP Descriptor Read Request may be confirmed through responses. In contrast, a result of the WP Descriptor Update Request may be confirmed through the Result Read Request.

Referring to table 5, the WP Descriptor Update Counter may mean a counter value requested up to now. "Nonce" may mean a random number for protecting replay attack. The WP Descriptor may mean a WP Descriptor to be applied or applied. "Result" may mean a result on a request and may provide whether a request is passed or failed and fail causes. The Hash-based Message Authentication Code (HMAC) may be used to authenticate a request. The host 3100 may calculate the HMAC for the WP Descriptor Update Request using a key and a message.

Figure 14:
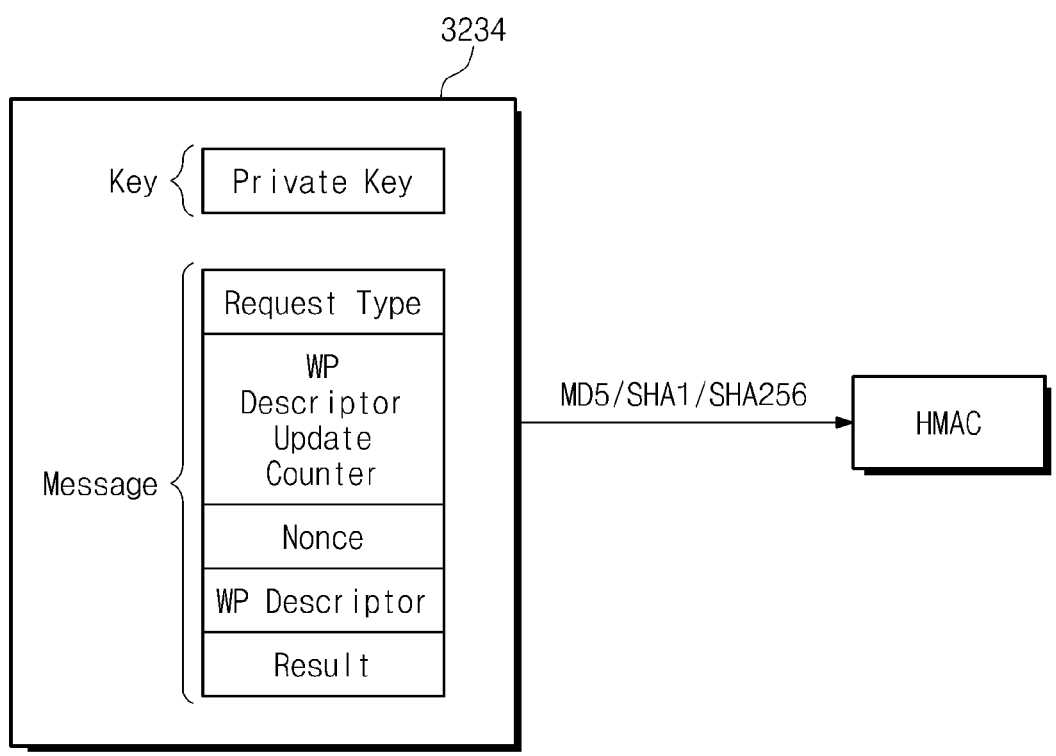
FIG. 14 is a conceptual diagram for describing a method of calculating HMAC.

FIG. 14 is a conceptual diagram for describing a method of calculating HMAC. HMAC may be calculated by a security manager 3234 shown in FIG. 9 of the HMAC 3250. Referring to FIG. 14, a security manager 3234 may calculate HMAC using a private key and a message. The message may include the following: Request Type, WP Descriptor Update Counter, Nonce, WP Descriptor, and Result. The security manager 3234 may calculate HMAC using MD5, SHA1, SHA256, etc.

Below, requests and responses shown in FIG. 13 will be more fully described.

1. WP Descriptor Update Counter Read Request/Response

A host 3100 may request a WP Descriptor Update Counter requested up to now to set write protection. The host 3100 may provide a storage device 3200 with a WP Descriptor Update Counter Read Request to request an update count of a WP Descriptor.

The following table 6 exemplarily shows a data frame of the Descriptor Update Counter Read Request.

TABLE 6

| Name | Description |
|---|---|
| Request Type | 0x1 |
| WP Descriptor Update Counter | 0x0 |

TABLE 6-continued

| Name | Description |
| --- | --- |
| Nonce | Random number generated by host |
| WP Descriptor | 0x0 |
| Result | 0x0 |
| HMAC | 0x0 |

Referring to table 6, a request type may be "0x1", the WP Descriptor Update Counter may be "0x0", "Nonce" may indicate a random number that a host generates. The CPU in the host may include a random number is generator. WP Descriptor may be set to "0x0", "Result" may be "0x0", and HMAC may be "0x0".

In response to a request shown in table 6, the storage device 3200 may provide the host 3100 with a response shown in the following table 7. That is, the host 3100 may read a data frame shown in table 7 and may identify a current WP Descriptor Update Counter.

TABLE 7

| Name | Description |
| --- | --- |
| Response Type | 0x5 |
| WP Descriptor Update Counter | Current value of current mobile storage |
| Nonce | Random number generated by host |
| WP Descriptor | 0x0 |
| Result | Executed result on request |
| HMAC | HMAC calculated by mobile storage |

Referring to table 7, a response type may be "0x5", the WP Descriptor Update Counter may indicate a count by which a WP Descriptor is updated. The security manager 3234 may include a counter that is incremented each time the WP Descriptor is updated. "Nonce" may be a random number that a host generates, and is received in the request. The WP Descriptor may be "0x0", "Result" may indicate a result on a request, and HMAC may indicate a value that a security manager 3234 calculates.

When generating a data frame shown in table 7, the storage device 3200 may use values of the following table 8 to calculate HMAC.

TABLE 8

| Name | Description |
| --- | --- |
| Private Key | Shared Private Key |
| Response Type | 0x5 |
| WP Descriptor Update Counter | Current value of current mobile storage |
| Nonce | Random number generated by host |
| WP Descriptor | 0x0 |
| Result | Executed result on request |

Referring to table 8, a private key may be a key that the host 3100 and the storage device 3200 share (e.g., pre-stored in ROM 3230 during manufacture), and a response type may be "0x5". The WP Descriptor Update Counter may indicate a count by which the storage device times 3200 updates the WP Descriptor up to now. "Nonce" may be a random number that a host generates. The WP Descriptor may be "0x0", and "Result" may indicate a result on a request. The host 3100 may read a data frame and may calculate HMAC. The host 3100 may authenticate a response using the HMAC and may identify a Nonce value to protect replay attack.

2. WP Descriptor Read Request

To set write protection, the host 3100 may read a WP Descriptor currently applied and may identify current setting and configuration. The host 3100 may provide a WP Descriptor Read Request to the storage device 3200. The following table 9 shows a data frame of the WP Descriptor Read Request.

TABLE 9

| Name | Description |
| --- | --- |
| Request Type | 0x2 |
| WP Descriptor Update Counter | 0x0 |
| Nonce | Random number generated by host |
| WP Descriptor | 0x0 |
| Result | 0x0 |
| HMAC | 0x0 |

Referring to table 9, a request type may be "0x2", and the WP Descriptor Update Counter may be "0x0". "Nonce" may be a random number that a host generates. The WP Descriptor may be "0x0", and "Result" may be "0x0". HMAC may be "0x0".

In response to a request shown in table 9, the storage device 3200 may provide the host 3100 with a response shown in the following table 10. The host 3100 may read a data frame shown in table 10 and may identify the WP Descriptor.

TABLE 10

| Name | Description |
| --- | --- |
| Response Type | 0x6 |
| WP Descriptor Update Counter | 0x0 |
| Nonce | Random number generated by host |
| WP Descriptor | Current value of current mobile storage |
| Result | Executed result on request |
| HMAC | HMAC calculated by mobile storage in table 11 |

Referring to table 10, a request type may be "0x6", and the WP Descriptor Update Counter may be "0x0". "Nonce" may be a random number that a host generates. The WP Descriptor may be a current value of the WP Descriptor, and "Result" may indicate a result on a request. HMAC may be a value that the security manager 3234 or HMAC 3250 calculates.

When generating a data frame shown in table 10, the storage device 3200 may use values in the following table 11 to calculate HMAC.

TABLE 11

| Name | Description |
| --- | --- |
| Private Key | Shared Private Key |
| Request Type | 0x6 |
| WP Descriptor Update Counter | 0x0 |
| Nonce | Random number generated by host |
| WP Descriptor | Current value of current mobile storage |
| Result | Executed result on request |

Referring to table 11, a private key may be a key that the host 3100 and the storage device 3200 share, and a response type may be "0x6". The WP Descriptor Update Counter may be "0X0". "Nonce" may be a random number that a host generates. The WP Descriptor may be a current WP Descriptor value of the storage device 3200, and "Result" may indicate a result on a request. The security manager 3234 or HMAC 3250 may read a data frame of table 11 and may calculate HMAC.

3. WP Descriptor Update Request

To set write protection newly, the host 3100 may newly configure a WP Descriptor to be applied and may request an update operation to the storage device 3200 using the new WP Descriptor. To request an update operation about the WP Descriptor, the host 3100 may generate HMAC using input values shown in the following table 12.

TABLE 12

| Name | Description |
|---|---|
| Private Key | Shared Private Key |
| Request Type | 0x3 |
| WP Descriptor Update Counter | Current value of current mobile storage |
| Nonce | 0x0 |
| WP Descriptor | Descriptor to be changed |
| Result | 0x0 |

Referring to table 12, a private key may be a key that the host 3100 and the storage device 3200 share, and a response type may be "0x3". The WP Descriptor Update Counter may indicate a count by which the storage device 3200 updates the WP Descriptor up to now. "Nonce" may be "0x0", the WP Descriptor may be a WP Descriptor value to be changed, and "Result" may be "0x0".

The following table 13 shows a data frame of the WP Descriptor Update Request. The host 3100 may provide the storage device 3200 with a data frame shown in the following table 13.

TABLE 13

| Name | Description |
|---|---|
| Request Type | 0x3 |
| WP Descriptor Update Counter | Current value of current mobile storage |
| Nonce | 0x0 |
| WP Descriptor | Descriptor to be changed |
| Result | 0x0 |
| HMAC | HMAC calculated by mobile storage in table 12 |

Referring to table 13, a response type may be "0x3", and the WP Descriptor Update Counter may indicate a count by which the storage device 3200 updates the WP Descriptor up to now. "Nonce" may be "0x0", and the WP Descriptor may be a WP Descriptor value to be changed. "Result" may be "0x0", and HMAC may be a value that the host 3100 calculates using the data frame shown in table 12.

The host 3100 may provide the storage device 3200 with a data frame shown in table 13 to update the WP Descriptor. The storage device 3200 may receive the WP Descriptor Update Request, may process the request normally, and may increase the WP Descriptor Update Counter.

4. Result Read Request/Response

After requesting an update operation about the WP Descriptor, the host 3100 may use a Result Read Request to identify a result on the request. The host 3100 may configure a data frame shown in the following table 14 for the Result Read Request and may provide it to the storage device 3200.

TABLE 14

| Name | Description |
|---|---|
| Request Type | 0x4 |
| WP Descriptor Update Counter | 0x0 |
| Nonce | 0x0 |
| WP Descriptor | 0x0 |
| Result | 0x0 |
| HMAC | 0x0 |

Referring to table 14, a response type may be "0x4", and the WP Descriptor Update Counter may be "0x0". "Nonce" may be "0x0", and the WP Descriptor may be "0x0". "Result" may be "0x0", and HMAC may be "0x0". In response to a request shown in table 14, the storage device 3200 may provide the host 3100 with a data frame shown in the following table 15. The host 3100 may read a data frame shown in table 15 and may identify a result of updating the WP Descriptor.

TABLE 15

| Name | Description |
|---|---|
| Response Type | 0x7 |
| WP Descriptor Update Counter | Current value of current mobile storage |
| Nonce | 0x0 |
| WP Descriptor | 0x0 |
| Result | Executed result on Request |
| HMAC | HMAC calculated by mobile storage |

Referring to table 15, a response type may be "0x7", and the WP Descriptor Update Counter may indicate a count by which the storage device 3200 updates the WP Descriptor up to now. "Nonce" may be "0x0", and the WP Descriptor may be "0x0". "Result" may indicate a result on a request, and HMAC may be a value that the security manager 3234 or HMAC 3250 calculates. When generating a data frame shown in table 15, the security manager 3234 may use values in the following table 16 to calculate HMAC.

TABLE 16

| Name | Description |
|---|---|
| Private Key | Shared Private Key |
| Response Type | 0x7 |
| WP Descriptor Update Counter | Current value of current mobile storage |
| Nonce | 0x0 |
| WP Descriptor | 0x0 |
| Result | Executed result on Request |

Referring to table 16, a private key may be a key that the host 3100 and the storage device 3200 share, and a response type may be "0x7". The WP Descriptor Update Counter may indicate a count by which the storage device 3200 updates the WP Descriptor up to now. "Nonce" may be "0x0", the WP Descriptor may be "0x0", and "Result" may indicate a result of a request. The host 3100 may read a data frame shown in table 16 and may calculate HMAC.

Figure 15:
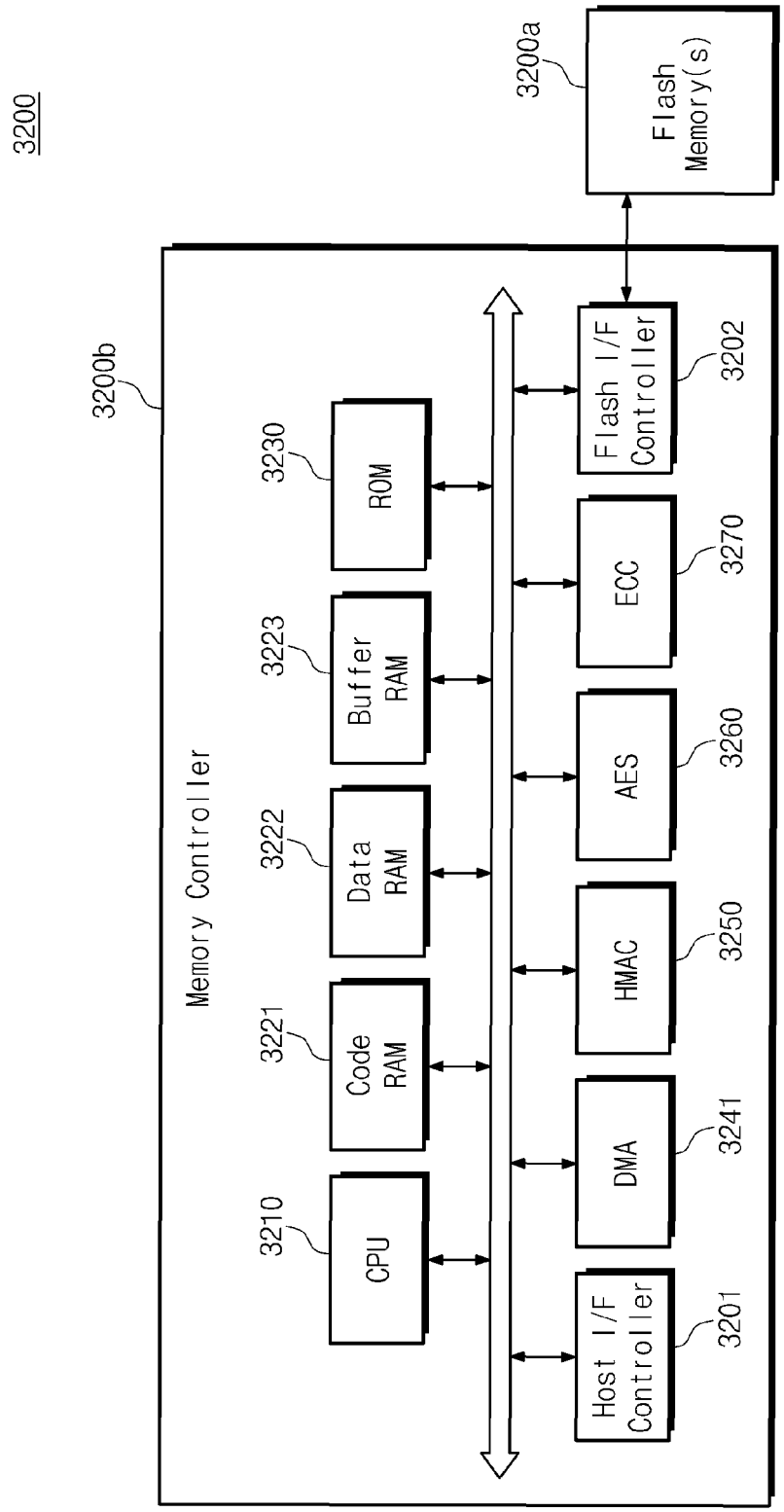
FIG. 15 is a block diagram schematically illustrating a hardware configuration of a UFS device based on a flash memory.
Figure 16:
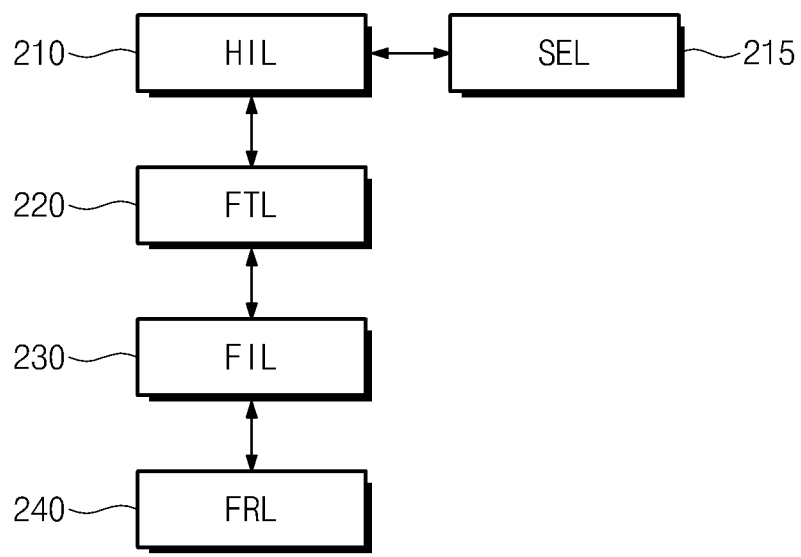
FIG. 16 is a block diagram schematically illustrating a software layer structure.

FIG. 15 is a block diagram schematically illustrating a hardware configuration of a UFS device based on a flash memory. FIG. 16 is a block diagram schematically illustrating a software layer structure.

Referring to FIG. 15, a UFS device 3200 may contain a flash memory 3200a and a memory controller 3200b. The memory controller 3200b may be connected to a host through a host interface controller 3201 and to the flash memory 3200a through a flash interface controller 3202. The memory controller 3200b may contain a central processing unit (CPU) 3210, a code RAM 3221, a data RAM 3222, a buffer RAM 3223, and a ROM 3230.

The CPU 3210 may control an overall operation of the memory controller 3200b. For example, at booting, the CPU 3210 may load a boot code stored in the flash memory 3200a, the ROM 3230, or a boot memory 1240 (refer to FIG. 2) onto the code RAM 3221 to control the booting of the UFS card 3200.

As illustrated in FIG. 15, the memory controller 3200b may further include a direct memory access (DMA) 3240 for accessing a memory directly, an HMAC 3250 and an AES (Advanced Encryption Standard) 3260 for data security, and ECC 3270 for correcting an error of data.

Referring to FIG. 16, a software layer structure of the UFS device 3200 may include a host interface layer (HIL) 210, a security layer (SEL) 215, a flash translation layer (FTL) 220, a flash interface layer (FIL) 230, and a flash recovery layer (FRL) 240.

Based on the host interface layer (HIL) 210, the CPU 3210 may control operations of receiving data from a host through the host interface controller 3201 and storing the received data at the data RAM 3221. When exchanging data with the host, the CPU 3210 may use the security layer (SEL) 215 to authenticate a host command and to perform an authentication operation. A security manager 3234 shown in FIG. 6 may be software that is run on the security layer (SEL) 215.

Based on the flash interface layer (FIL) 230, the CPU 3210 may provide data stored at the data RAM 3222 or the buffer RAM 3223 to the flash memory 3200a through the flash interface controller 3202. The CPU 3210 may manage address mapping of the flash memory 3200a, depending on the flash translation layer (FTL) 220. The CPU 3210 may manage a recovery operation of the flash memory 3200a, depending on the flash recovery layer (FRL) 240.

Meanwhile, a storage system according to an embodiment of the inventive concepts is applicable to a variety of products. The storage system according to an embodiment of the inventive concepts may be implemented in electronic devices, such as a personal computer, a digital camera, a camcorder, a handheld telephone, an MP3 player, a Portable Media Player (PMP), a PlayStation Player (PSP), and a Personal Digital Assistant (PDA). A storage medium of the storage system may be implemented with storage devices, such as a memory card, a USB memory, and a Solid State Drive (SSD).

Figure 17:
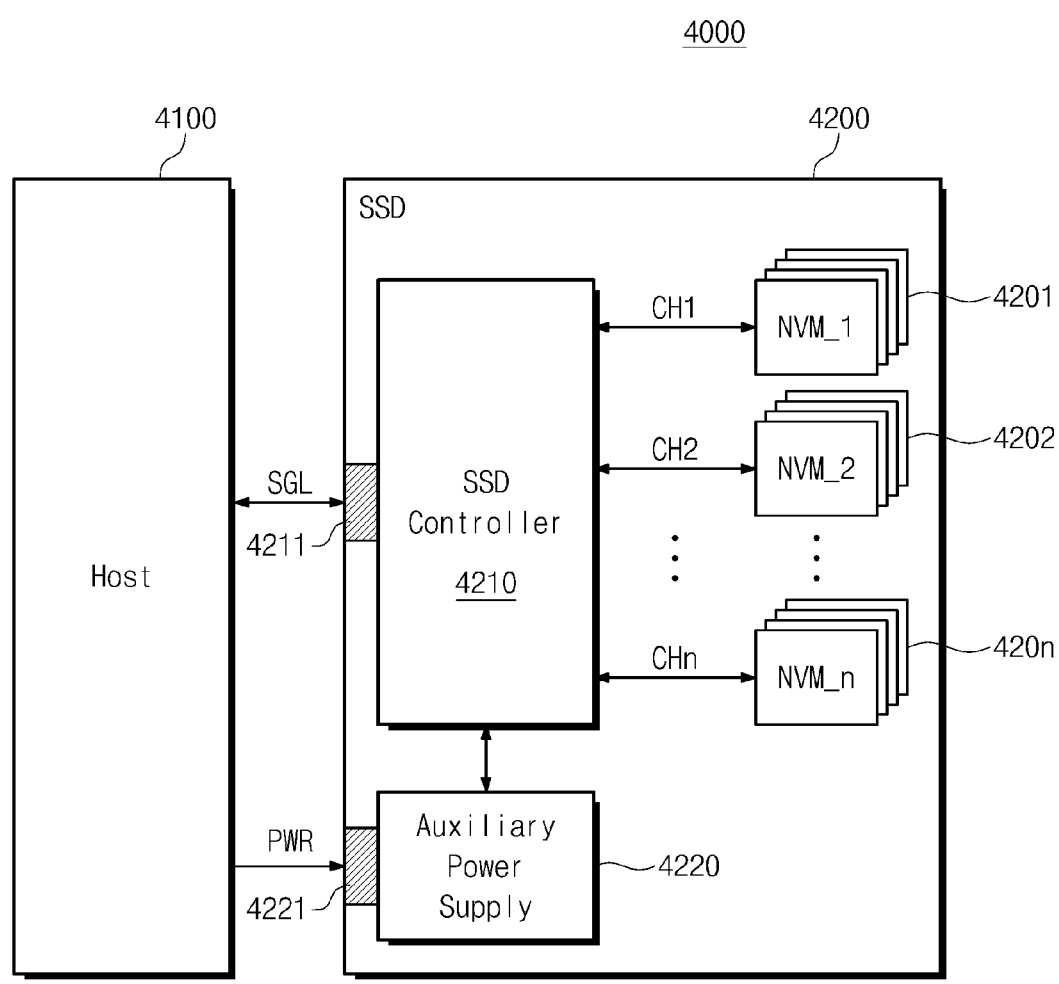
FIG. 17 is a block diagram illustrating a solid state drive to which a storage device according to the inventive concepts is applied.

FIG. 17 is a block diagram illustrating a solid state drive to which a storage device according to the inventive concepts is applied. Referring to FIG. 17, a solid state drive (SSD) system 4000 may include a host 4100 and an SSD 4200.

The SSD 4200 may exchange signals SGL with the host 4100 through a signal connector 4211 and may be supplied with a power through a power connector 4221. The SSD 4200 may include a plurality of flash memories 4201 through 420n, an SSD controller 4210, and an auxiliary power supply 4220.

The plurality of flash memories 4201 through 420n may be used as a storage medium of the SSD 4200. Not only may the SSD 4200 employ the flash memory, but it may employ nonvolatile memory devices, such as PRAM, MRAM, ReRAM, and FRAM. The flash memories 4201 through 420n may be connected with the SSD controller 4210 through a plurality of channels CH1 through CHn. One channel may be connected with one or more flash memories. Flash memories connected with one channel may be connected with the same data bus.

The SSD controller 4210 may exchange signals SGL with the host 4100 through the signal connector 4211. The signals SGL may include the following: a command, an address, and data. The SSD controller 4210 may be configured to write or read out data to or from a corresponding flash memory in response to a command of the host 4100. The SSD controller 4210 will be more fully described with reference to FIG. 18.

The auxiliary power supply 4220 may be connected with the host 4100 through the power connector 4221. The auxiliary power supply 4220 may be charged by a power PWR from the host 4100. The auxiliary power supply 4220 may be placed inside or outside the SSD 4200. For example, the auxiliary power supply 4220 may be put on a main board to supply an auxiliary power to the SSD 4200.

Figure 18:
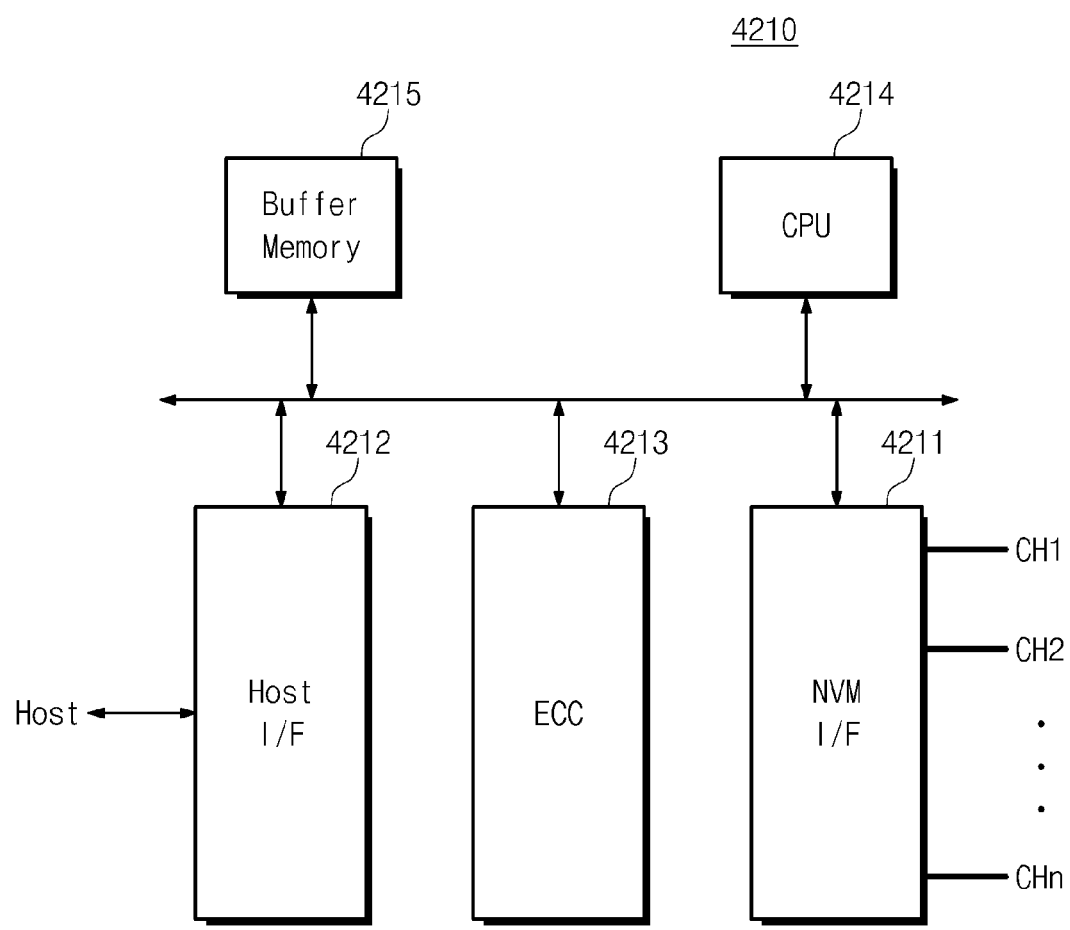
FIG. 18 is a block diagram schematically illustrating an SSD controller shown in FIG. 17.

FIG. 18 is a block diagram schematically illustrating an SSD controller shown in FIG. 17. Referring to FIG. 18, an SSD controller 4210 may include an NVM interface 4211, a host interface 4212, an ECC circuit 4213, a central processing unit (CPU) 4214, and a buffer memory 4215.

The NVM interface 4211 may scatter data transferred from the buffer memory 4215 into channels CH1 through CHn. The NVM interface 4211 may transmit data read from flash memories 4201 through 420n to the buffer memory 4215. The NVM interface 4211 may use a flash memory interface manner, for example. That is, the SSD controller 4210 may perform a read, a write, and an erase operation in the flash memory interface manner.

The host interface 4212 may provide an interface with an SSD 4200 in compliance with the protocol of the host 4100. The host interface 4212 may communicate with the host 4100 by means of USB (Universal Serial Bus), SCSI (Small Computer System Interface), PCI express, ATA, PATA (Parallel ATA), SATA (Serial ATA), SAS (Serial Attached SCSI), and so on. The host interface 4212 may also perform disk emulation which enables the host 4100 to recognize the SSD 4200 as a hard disk drive (HDD).

The ECC circuit 4213 may generate an error correction code ECC by means of data transferred to the flash memory 4201 through 420n. The error correction code ECC thus generated may be stored at spare areas of the flash memory 4201 through 420n. The ECC circuit 4213 may detect an error of data read from the flash memory 4201 through 420n. If the detected error is correctable, the ECC circuit 4213 may correct the detected error.

The CPU 4214 may analyze and process signals received from a host 4100 (refer to FIG. 17). The CPU 4214 may control the host 4100 through the host interface 4212 or the flash memories 4201 through 420n through the NVM interface 4211. The CPU 4214 may control the flash memories 4201 through 420n by means of firmware for driving an SSD 4200.

The buffer memory 4215 may temporarily store write data provided from the host 4100 or data read from a flash memory. Also, the buffer memory 4215 may store metadata to be stored in the flash memories 4201 through 420n or cache data. At sudden power-off, the metadata or cache data stored at the buffer memory 4215 may be stored in the flash memories 4201 through 420n. The buffer memory 4215 may be implemented with a DRAM, an SRAM, and so on.

Figure 19:
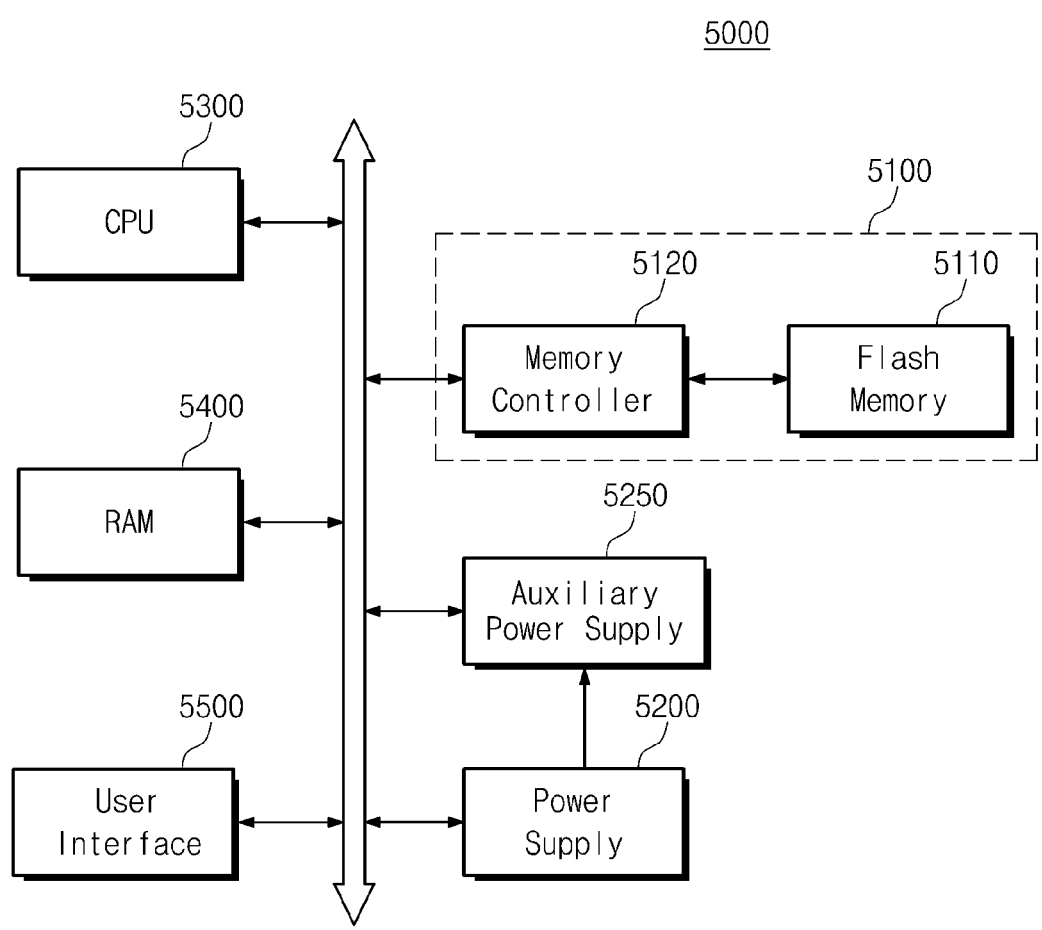
FIG. 19 is a block diagram schematically illustrating an electronic device including a storage device according to an embodiment of the inventive concepts.

FIG. 19 is a block diagram schematically illustrating an electronic device including a storage device according to an embodiment of the inventive concepts. An electronic device 5000 may be implemented with a personal computer or with handheld electronic devices, such as a notebook computer, a cellular phone, a PDA, and a camera.

Referring to FIG. 19, the electronic device 5000 may include a memory system 5100, a power supply 5200, an auxiliary power supply 5250, a central processing unit (CPU) 5300, a random access memory (RAM) 5400, and a user interface 5500. The memory system 5100 may contain a flash memory 5110 and a memory controller 5120.

Figure 20:
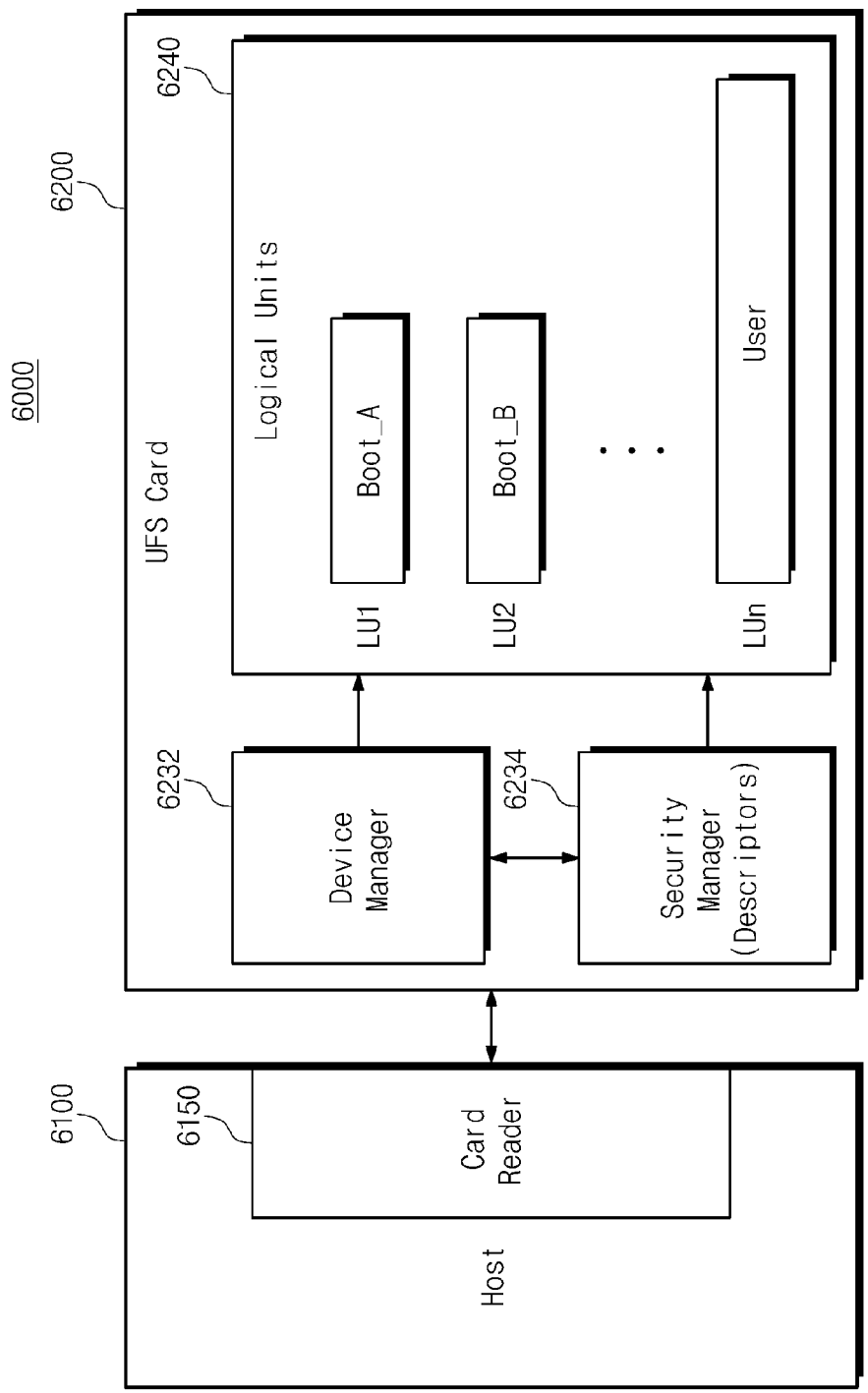
FIG. 20 is a block diagram schematically illustrating another embodiment of a storage system shown in FIG. 6.

FIG. 20 is a block diagram schematically illustrating another embodiment of a storage system shown in FIG. 6. Referring to FIG. 20, a storage system 6000 may include a host 6100 and a UFS card 6200. A card reader 6150 may be embedded in the host 6100. The host 6100 and the card reader 6150 may be interconnected through an interface (e.g., USB). The host 6100 and the card reader 6150 may be interconnected through a UFS interface as described with reference to FIG. 6.

The UFS card 6200 may include a device manager 6232, a security manager 6234, and logical units 6240. First and second logical units LU1 and LU2 may be boot partitions for storing boot codes Boot_A and Boot_B, and a remaining logical unit LUn may be a user partition for storing user data. The security manager identify 6234 may store an authentication existence field bDeviceLocked indicating whether or not of authentication and an authentication location field bAuthPartition indicating a boot partition where an authentication program is stored, at a device descriptor.

Based on the authentication existence field bDeviceLocked, the host 6100 may determine whether a removable UFS card 6200 supporting a security function is connected. Also, the host 6100 may identify the authentication location field bAuthPartition to determine whether to mount any one of the boot partition A and the boot partition B.

With embodiments of the inventive concepts, a host may automatically recognize and authenticate a removable UFS card, thereby making it possible to use a UFS card with a security function more easily and more conveniently.

While the inventive concepts has been described with reference to some example embodiments, it will be apparent to those skilled in the art that various changes and modifications may be made without departing from the spirit and scope of the inventive concepts. For example, the spirit and scope of the inventive concepts may not be limited to a flash memory device. The inventive concepts may be applied to all store devices that translate addresses using a translation layer. Therefore, it should be understood that the above embodiments are not limiting, but illustrative.

What is claimed is:

1. A memory card comprising:
   a nonvolatile memory configured to store data; and
   a device controller configured to divide the nonvolatile memory into a plurality of logical units and to store an authentication program at a partial area of the plurality of logical units,
   wherein when connected with a host, the device controller is configured to enable the authentication program to be executable on the host,
   wherein the plurality of logical units have one or more boot partitions, the partial area corresponds to one of the one or more boot partitions, and the authentication program is stored at the partial area,
   wherein the device controller is used as a security manager configured to send the authentication program to the host using authentication information about the authentication program included in a device descriptor to manage the authentication program,
   wherein the security manager stores authentication information about the authentication program to the device descriptor, and
   wherein the device descriptor includes an authentication existence field for identifying whether the authentication program exists or not.

2. The memory card of claim 1, wherein the nonvolatile memory and the device controller form at least a portion of a UFS card.

3. The memory card of claim 1, wherein the device descriptor includes an authentication location field for identifying a boot partition where the authentication program is stored.

4. A storage system comprising:
   a host;
   a card reader connected with the host; and
   a memory card inserted into the card reader for a connection with the host,
   wherein the memory card stores an authentication program to a partial area of a plurality of logical units, and
   wherein when connected with the host, the memory card enables the authentication program to be executable on the host; wherein the memory card includes,
   a nonvolatile memory configured to store data, and
   a device controller configured to store and manage the authentication program at a partial area of the plurality of logical units, and wherein
   the device controller stores authentication information about the authentication program to a device descriptor, and wherein
   the device descriptor includes an authentication existence field for identifying whether the authentication program exists or not.

5. The storage system of claim 4, wherein the device descriptor includes an authentication location field for identifying a boot partition where the authentication program is stored.

* * * * *